US012596441B2

(12) United States Patent
Wang

(10) Patent No.: US 12,596,441 B2
(45) Date of Patent: Apr. 7, 2026

(54) CHINESE CHARACTER INPUT METHOD, SYSTEM AND KEYBOARD

(71) Applicant: John Zhongqi Wang, Bellevue, WA (US)

(72) Inventor: John Zhongqi Wang, Bellevue, WA (US)

( * ) Notice: Subject to any disclaimer, the term of this patent is extended or adjusted under 35 U.S.C. 154(b) by 476 days.

(21) Appl. No.: 17/304,850

(22) Filed: Jun. 27, 2021

(65) Prior Publication Data

US 2023/0004730 A1    Jan. 5, 2023

(51) Int. Cl.
| | |
|---|---|
| *G06F 3/01* | (2006.01) |
| *G06F 3/023* | (2006.01) |
| *G06F 3/0488* | (2022.01) |
| *G06F 3/04886* | (2022.01) |
| *G06F 40/129* | (2020.01) |

(52) U.S. Cl.
CPC ............ *G06F 3/018* (2013.01); *G06F 3/0233* (2013.01); *G06F 3/04886* (2013.01); *G06F 40/129* (2020.01); *G06F 3/023* (2013.01)

(58) Field of Classification Search
CPC .. G06F 3/04886; G06F 3/04883; G06F 3/023; G06F 3/0233; G06F 40/129; G06F 40/126; G06F 3/0237; G06F 3/018; G09B 5/06; G09B 19/06; G06V 30/10
See application file for complete search history.

(56) References Cited

U.S. PATENT DOCUMENTS

| | | | | |
|---|---|---|---|---|
| 5,378,068 A * | 1/1995 | Hua | ........................ | G06F 3/018 |
| | | | | 715/263 |
| 2001/0052900 A1* | 12/2001 | Lee | ........................ | G06F 3/018 |
| | | | | 345/467 |
| 2005/0065775 A1* | 3/2005 | Poon | ........................ | G06F 3/018 |
| | | | | 704/7 |
| 2015/0040058 A1* | 2/2015 | Zhang | .................... | G06F 3/018 |
| | | | | 715/780 |

* cited by examiner

*Primary Examiner* — Xuemei Zheng

(57)    ABSTRACT

The invention discloses a Chinese character input method, system and a keyboard, and relates to the technical field of computers. A specific implementation of the method includes: recognizing the received key signal; in the case where the recognition result of the received key signal indicates a Chinese character Category Code and/or phrase Category Code, determining the recognized Chinese character and/or phrase represented by the Chinese character Category Code and/or the phrase Category Code; where the Chinese character Category Code is a combination of component Category Codes or a combination of component Category Codes and stroke Category Codes, used to represent Chinese characters; phrase Category Codes are combinations of component Category Codes, used to indicate phrases; display the determined Chinese characters and/or phrases. This implementation method solves the problem of messy character splitting, conforms to the character theory, is easy to remember and easy to use, does not require special learning. The entire input process is very natural, there are not many rules, the learning difficulty is reduced, and there are no special requirements for equipment conditions.

17 Claims, 7 Drawing Sheets

| Strokes | Stroke Category Code | Strokes | Stroke Category Code | Strokes | Stroke Category Code |
|---|---|---|---|---|---|
| 一 | G | ㄴ | B | ㇟ | B |
| ノ | G | ㇉ | B | ㇈ | B |
|丨 | Y | ㄥ(ノ) | B | ㄣ(ㄅ, ㄣ) | B |
| 亅 | Y | ㇜ | B | ㄴ | B |
| ノ | T | ノ | B | ㇋ | B |
| 丶 | H | ㇀ | B | ㇄ | B |
| 乀 | H | ㇆ | B | ㄴ(乙) | B |
| 乛( ノ) | B | ㇚ | B | ㇉ | B |
| ㇇( ノ) | B | ㇊ | B | ㇉(㇋) | B |
| ㇀ | B | ㇏ | B | ㇋(㇋) | B |
| | B | ㇌(㇌) | B | | |

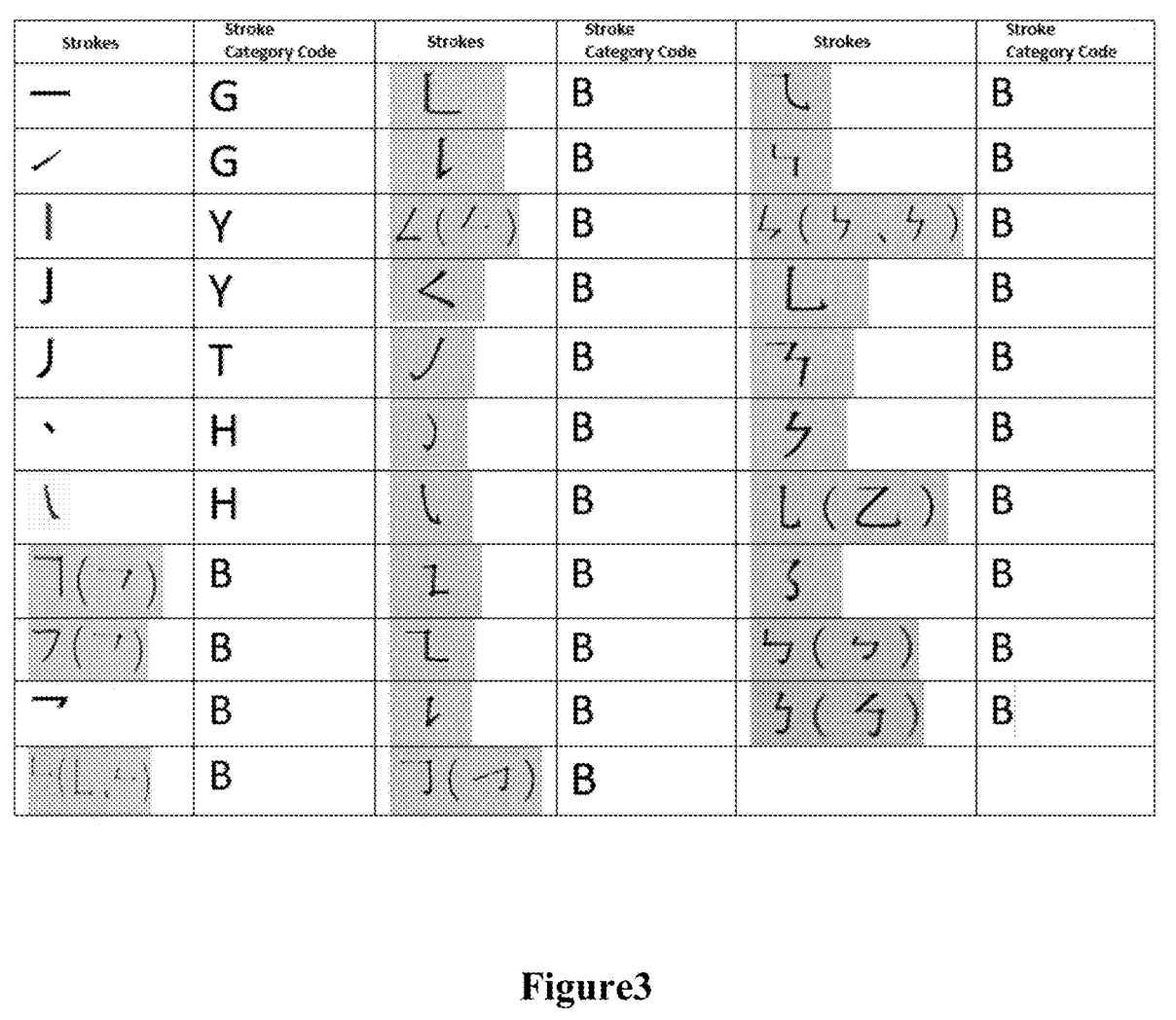

| Strokes | Stroke Category Code | Strokes | Stroke Category Code | Strokes | Stroke Category Code |
|---|---|---|---|---|---|
| — | G | L | B | ㇄ | B |
| ╱ | G | ↓ | B | 丩 | B |
| ┃ | Y | ∠ ( ⁄ ) | B | ㇟ ( 𠃊 , 𠄌 ) | B |
| J | Y | < | B | L | B |
| J | T | ⌐ | B | ㇅ | B |
| ` | H | ) | B | ㇆ | B |
| \ | H | \ | B | ㇌ ( ⼄ ) | B |
| ㇕ ( ⼁ ) | B | ㇗ | B | ㇖ | B |
| ㇇ ( ⼂ ) | B | ㇗ | B | ㇈ ( ⼃ ) | B |
| ⺄ | B | ↓ | B | ㇉ ( ⼅ ) | B |
| ㇄ ( ⼗ ) | B | J ( ⼋ ) | B | | |

Figure3

CHINESE CHARACTER INPUT METHOD, SYSTEM AND KEYBOARD

TECHNICAL FIELD

The invention relates to the field of computer technology, in particular to a Chinese character input method, system and a keyboard.

BACKGROUND TECHNIQUE

Chinese character input methods are divided into Shape Code, voice code, handwriting and voice input methods from high level classification. At present, among the shape input methods, the Wubi shape input method is used the most. The Wubi shape input method is an earlier shape input method. There is no standard to learn from the character splitting at that time, so it is messy and does not conform to the character theory. In addition, its various rules are very complicated and difficult to learn. Voice code is input into computers based on the pronunciation of Chinese characters, currently, the most commonly used voice code is Chinese pinyin input method. The pinyin input method has a high code repetition rate, and users are always in constant selection of characters, and the speed is slow. The handwriting input method is to input directly on the input terminal by hand or an electronic pen. Its disadvantage is that the speed is slow, and it is also limited by the hardware input device. The voice input method is to speak directly to the machine, and is translated by software and hardware. It has high requirements for pronunciation accuracy, hardware and software equipment.

In the process of implementing the present invention, the inventor found that at least the following problems exist in the prior art:

The character splitting is messy and does not conform to the character theory, the rules are very complicated, the learning is difficult, the repetition rate is high, the input speed is slow, and the requirements for pronunciation and equipment conditions are high.

SUMMARY OF THE INVENTION

In view of this, the embodiments of the present invention provide a Chinese character input method and system and a keyboard, which solve the problem of disordered character splitting, conforms to the character theory, is easy to remember and easy to use, does not require special learning, and the entire input process is very natural without many rules, and reduces the difficulty of learning, the repetition rate is low, the input speed is fast, and there are no special requirements for pronunciation and equipment conditions.

To achieve the foregoing objective, according to one aspect of the embodiments of the present invention, a method for inputting Chinese characters is provided.

A method for inputting Chinese characters, including: recognizing a received key signal; in the case where the recognition result of the received key signal indicates a Chinese character Category Code and/or phrase Category Code, determining the recognized the Chinese character and/or phrase represented by the Chinese character Category Code and/or the phrase Category Code; where the Chinese character Category Code is a combination of component Category Codes or a combination of component Category Codes and stroke Category Codes, used to represent Chinese characters; phrase Category Codes are combinations of component Category Codes, used to express phrases; display the determined Chinese characters and/or phrases.

Optionally, the identifying a received key position signal includes: identifying whether the received key position signal includes a key position signal of a reserved key position, and if the key position signal of the reserved key position is not included, then the recognition result of the received key signal is indicated as a Chinese character Category Code and/or a phrase Category Code.

Optionally, the recognizing a received key position signal further includes: if the received key position signal includes the key position signal of the reserved key position, and the received key position signal is a target combination of the key position signal of the key position and the key position signal of the reserved key position, then the recognition result of the received key position signal is indicated as being used to query the signal of a Basic Component of a target key position; the target key is a key used to represent a component Category Code; the method further includes: displaying Basic Components of the category corresponding to the component Category Code represented by the target key.

Optionally, the recognizing the received key position signal further includes: if the received key position signal includes the key position signal of the reserved key position and the first key position signal in the received key position signal, the recognition result of the received key position signal is indicated as the pinyin input signal, wherein the key position input after the reserved key position corresponds to the key signal is recognized as pinyin; the method further includes: displaying the Chinese character or phrase corresponding to the pinyin.

Optionally, the determination of the Chinese character and/or phrase represented by the recognized Chinese character Category Code and/or phrase Category Code includes: according to the key combination corresponding to the received key signal, in a Chinese character category input method table and phrase input method table, the Chinese character Category Code and the phrase Category Code that are consistent with the key combination are respectively searched, and the Chinese character and/or phrase represented by the searched Chinese character Category Code and/or phrase Category Code are determined, wherein a Chinese character category input method table records the correspondence between Chinese characters and Chinese character Category Codes, and a phrase input method table records the correspondence between phrases and phrase Category Codes.

Optionally, it further includes pre-generating the Chinese character Category Code of each Chinese character to obtain the Chinese character category input method table, wherein the Chinese character Category Code is generated in the following manner: determining the number of components of the Chinese character for which the Chinese character Category Code is to be generated, the number of components is the number of Chinese character Basic Components contained in the Chinese character Category Code to be generated; if the number of components is 1, then the component Category Code of the unique component and part or all of the stroke Category Code of the component is used to generate the Chinese character Category Code; if the number of components is 2, then the Basic Component Category Code of the two components and part or all of the stroke Category Code of the second component is used to generate the Chinese character Category Code; if the number of components is greater than or equal to 3, then the Chinese character Category Code is to be generated according to all of the Category Code of the Basic Components.

Optionally, according to the Shape Code of a Basic Component, from Basic Components query the corresponding part or all of the stroke Category Codes in the stroke Category Code table; among them, for strokes that do not exceed the preset number of Basic Components, the stroke Category Code table records the correspondence relationship between the Basic Component Shape Code and part or all stroke Category Codes of Basic Component; for the number of strokes exceeding the preset number of Basic Components, the stroke Category Code table records the corresponding relationship between the Basic Component Shape Code and the preset number of stroke Category Codes of the Basic Component.

Optionally, according to Basic Components, a stroke type is configured with the corresponding stroke Category Code for each stroke, where: for the strokes which are component type strokes except for folding pen strokes, the configured stroke Category Code is the component Category Code of the stroke; for the folding pen strokes in the component type strokes and non-component type strokes, the configured stroke Category Code is the designated key position; the component type strokes are themselves Basic Component strokes, the non-component type strokes are not themselves Basic Component strokes.

Optionally, read Basic Component Shape Code from Shape Code table of Basic Components. Construct Basic Component Shape Code table as below: For all Basic Components according to the shape classification, get multiple Basic Component shape categories; take a different first alphabet as each Basic Component shape Category Code, and for each Basic Component shape category, use different second alphabets as the Basic Component's internal code of the component category to get each Basic Component Shape Code, one said Shape Code including a component Category Code and a component category internal code; according to each Basic Component Shape Code to generate each Basic Component ordered code table to construct the Basic Component Shape Code table.

Optionally, the component Category Code and the component category internal code are both letters.

Optionally, said all Basic Components include those Basic Components used to generate simplified characters, traditional characters, Chinese characters in Japanese, and Chinese characters in Korean.

Optionally, it further includes pre-generating the phrase Category Code of each phrase to obtain the phrase input method table, wherein the phrase Category Code of the phrase is generated in the following manner: determining the number of characters of the phrase to be generated for the phrase Category Code; if the number of characters is 2, then the phrase Category Code of the phrase is generated according to part or all of the component Category Codes of each Chinese character in the phrase Category Code to be generated; if the number of characters is greater than or equal to 3, then the phrase Category Code is generated according to the first component Category Code of each Chinese character in the phrase Category Code to be generated.

Optionally, the displaying the determined Chinese characters and/or phrases includes: sequentially displaying the determined Chinese characters and/or phrases according to the frequency of use of the determined Chinese characters and/or phrases.

Optionally, the method further includes: in response to a user's input instruction, displaying one of a plurality of virtual keyboards, the virtual keyboard including a plurality of virtual keys, the virtual keys correspond to the key positions one-to-one, and the virtual button is used to show the user some or all of Basic Components that match with the Basic Component shape category of the corresponding key position, the multiple virtual keyboards can be switched based on the user's selection instruction, the Basic Component shape category one-to-one correspondence with the key position.

According to another aspect of the embodiments of the present invention, a Chinese character input system is provided.

A Chinese character input system includes: a key signal recognition module for identifying the received key signal; a Chinese character and phrase determination module for indicating that in case the recognition result of the received key signal is a Chinese character Category code and/or a phrase Category Code, determine the Chinese character and/or phrase represented by the recognized Chinese character Category Code and/or phrase Category Code; wherein the Chinese character Category Code is a combination of component Category Codes or a combination of component Category Codes and stroke Category Codes, used to represent Chinese characters; phrase Category Code is a combination of component Category Codes, used to represent phrases; display module, used to display determined Chinese characters and/or phrases.

Optionally, a key position signal identification module is further used for identifying whether the received key position signal includes a reserved key position signal, and if it does not include the reserved key position signal, the recognition result of the received key signal is indicated as a Chinese character Category Code and/or a phrase Category Code.

Optionally, the key position signal identification module is further configured to: if the received key position signal includes the key position signal of the reserved key position, and the received key position signal is a combination of the key position signal of the target key and the key position signal of the reserved key position, the recognition result of the received key position signal is indicated as the Basic Component signal for querying the target key position; the target key position is used to indicate a key position of a component Category Code; the display module is also used to display the Basic Components corresponding to the Basic Component Category Code represented by the target key position.

Optionally, the key position signal identification module is further configured to: if the received key position signal includes the key position signal of the reserved key position, and the first key position signal in the received key position signal is the key position signal of the reserved key position, then the recognition result of the received key position signal is indicated as a pinyin input signal, wherein the key position signal corresponding to the key position entered after the reserved key position is recognized as pinyin; the display module is also used to display the Chinese characters or phrases corresponding to the pinyin.

Optionally, the Chinese character and phrase determination module is also used to: according to the key combination corresponding to the received key signal, search for the Chinese character category input method table and the phrase input method table for the Chinese character Category Code and phrase Category Code that are consistent with the key combination to determine the Chinese character and/or phrase represented by the searched Chinese character Category Code and/or phrase Category Code, wherein the Chinese character category input method table records the relationship between the Chinese character and the Chinese character Category Code. The corresponding relationship between the phrase and the phrase Category Code is recorded in the phrase input method table.

Optionally, it further includes a Chinese character category input method table generating module, which is used to generate the Chinese character Category Code of each Chinese character in advance to obtain the Chinese character category input method table, wherein the Chinese character Category Code of the Chinese character is generated in the following manner: Determine the number of components of the Chinese character that generates the Chinese character Category Code, where the number of components is the number of the Basic Components contained in the Chinese character which Category Code is to be generated; if the number of components is 1, then the unique Basic Component and its part or all of the stroke Category Code will be used to generate the Chinese character Category Code of the Chinese character; if the number of components is 2, then according to the Category Code of the two components and part or all of the stroke Category Code of the second component to generate Chinese character Category Code; if the number of components is greater than or equal to 3, then the Chinese character Category Code is to be generated according to the component Category Code of all the Basic Components of the Chinese character.

Optionally, it also includes a stroke Category Code query module for the Basic Component Shape Code, query the corresponding part or all of the stroke Category Codes from the Basic Component stroke Category Code table; among them, for Basic Components whose strokes do not exceed the preset number, the Basic Component stroke Category Code table records the correspondence relationship between the Basic Component Shape Code and all of stroke Category Codes; for Basic Components whose strokes exceeding the preset number, the Basic Component stroke Category Code table records corresponding relationship between Basic Component Shape Code and preset number of stroke Category Codes of the Basic Component.

Optionally, it also includes a stroke Category Code generation module. The stroke category of Basic Component is configured with the corresponding stroke Category Code for each stroke, where: for the strokes in the component type strokes except for the folding pen strokes, the configured stroke Category Code is the component Category Code of the stroke; for the folding pen strokes in the component type strokes and non-component type strokes, the configured stroke Category Code is the designated key position; the component type strokes are themselves Basic Component, the non-component type strokes are not themselves Basic Components.

Optionally, read Basic Component Shape Code from Basic Component Shape Code table, the system also includes Basic Component Shape Code table building module, used to build in the following Basic Components Shape Code table: For all Basic Components according to the shape classification, get multiple Basic Component shape categories; take a different first alphabet as component Category Code for each Basic Component shape category, and for each Basic Component shape category, use different second alphabets as the Basic Component internal code of the component category to get each Basic Component Shape Code, a said Shape Code including a component Category Code and a component category internal code; according to the Shape Code of each Basic Component to generate each Basic Component ordered code table to construct the Basic Component Shape Code.

Optionally, the component Category Code and the component category internal code are both letters.

Optionally, said all Basic Components including those Basic Components used to generate simplified characters, traditional characters, Chinese characters in Japanese, and Chinese characters in Korean.

Optionally, it further includes a phrase input method table generating module for generating the phrase Category Code of each phrase to obtain the phrase input method table, wherein the phrase Category Code of the phrase is generated by the following method: determining the number of characters in the phrase for the phrase category to be generated; if the number of characters is 2, the phrase Category Code of the phrase is generated according to part or all of the component Category Codes of each Chinese character in the phrase to be generated; if the number of characters is greater than or equal to 3, the phrase Category Code of the phrase is generated according to the first component Category Code of each Chinese character in the phrase of the phrase Category Code to be generated.

Optionally, the display module is further configured to display the determined Chinese characters and/or phrases in sequence according to the use frequency of the determined Chinese characters and/or phrases.

Optionally, the display module is further configured to: in response to a user's input instruction, display a virtual keyboard among a variety of virtual keyboards, the virtual keyboard includes a plurality of virtual keys, and the virtual keys and key positions are one by one correspondingly, a virtual key is used to show the user some or all of Basic Components in the Basic Components shape category, the multiple virtual keyboards can be switched based on the user's selection instruction, Basic Component shape category is one-to-one correspondence with the key position.

According to another aspect of the embodiments of the present invention, there is provided a keyboard for inputting Chinese characters based on the Chinese character input method of the embodiments of the present invention.

A keyboard for inputting Chinese characters based on the Chinese character input method of the embodiment of the present invention includes: keys matching the key positions corresponding to the component category codes and the stroke category codes, and keys matching reserved keys, so the keyboard generates corresponding key position signals according to the user's key operation.

According to another aspect of the embodiments of the present invention, an electronic device is provided.

An electronic device, comprising: one or more processors; a memory, used to store one or more programs, when the one or more programs are executed by the one or more processors, the one or more multiple processors implement the Chinese character input method provided by the embodiment of the present invention.

According to yet another aspect of the embodiments of the present invention, a computer-readable medium is provided.

A computer-readable medium with a computer program stored thereon, and when the program is executed by a processor, the Chinese character input method provided by the embodiment of the present invention is realized.

An embodiment of the above-mentioned invention has the following advantages or beneficial effects: recognize the received key signal; in the case where the recognition result of the received key signal indicates the Chinese character Category Code and/or phrase Category Code, the recognition is determined Chinese characters and/or phrases represented by the Chinese character Category Code and/or phrase Category Code; wherein the Chinese character Category Code is the combination of the component Category Code or the combination of the component Category Code and the stroke Category Code, which is used to represent Chinese characters; the phrase Category Code is the combination of component Category Codes, used to represent phrases; display determined Chinese characters and/or phrases. Solve the problem of messy character splitting, conform to the character theory, easy to remember and easy to use, no special learning is required, the entire input process is very natural, there are not many rules, and the learning difficulty is reduced. No special requirements.

The further effects of the above-mentioned non-conventional alternative manners will be described below in conjunction with specific implementation manners.

DESCRIPTION OF THE DRAWINGS

The drawings are used for a better understanding of the present invention, and do not constitute an improper limitation of the present invention. Among them:

FIG. 3 is a schematic diagram of a Chinese character stroke Category Code according to an embodiment of the present invention;

DETAILED IMPLEMENTATIONS

The following describes exemplary embodiments of the present invention with reference to the accompanying drawings, which include various details of the embodiments of the present invention to facilitate understanding, and should be regarded as merely exemplary. Therefore, those of ordinary skill in the art should recognize that various changes and modifications can be made to the embodiments described herein without decomponenting from the scope and spirit of the present invention. Likewise, for clarity and conciseness, descriptions of well-known functions and structures are omitted in the following description.

Figure 1:
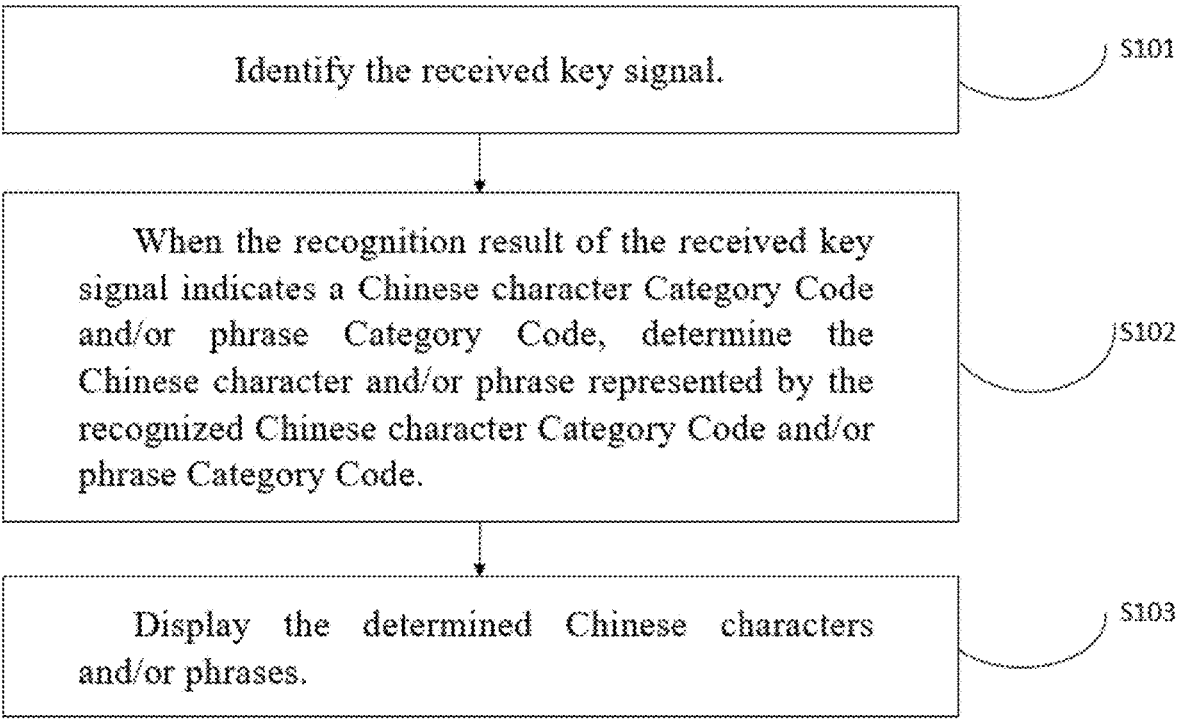
FIG. 1 is a schematic diagram of the main steps of a Chinese character input method according to an embodiment of the present invention.

FIG. 1 is a schematic diagram of the main steps of a Chinese character input method according to an embodiment of the present invention.

As shown in FIG. 1, the Chinese character input method of an embodiment of the present invention mainly includes the following steps S101 to S103.

Step S101: Identify the received key signal;

Step S102: When the recognition result of the received key signal indicates a Chinese character Category Code and/or phrase Category Code, determine the Chinese character and/or phrase represented by the recognized Chinese character Category Code and/or phrase Category Code;

Among them, the Chinese character Category Code is a combination of component Category Codes or a combination of component Category Codes and stroke Category Codes, which are used to represent Chinese characters; the phrase Category Code is a combination of component Category Codes, which are used to represent phrases;

Step S103: Display the determined Chinese characters and/or phrases.

The key position signal is generated by the keyboard when the user clicks, touches, or presses a key, and is sent to the Chinese character input system of the embodiment of the present invention. The Chinese character input system of the embodiment of the present invention can be located in various terminal devices such as mobile phones, computers, and Pads. A key position signal indicates that the user has input the corresponding key position. The key position corresponds to the key on the keyboard and is the character indicated by the key. For example, the key position corresponding to the "A" key on the keyboard is the letter A.

The step of identifying the received key position signal may include: identifying whether the received key position signal includes a reserved key position signal, if the reserved key position key position signal is not included, then the recognition result of the received key position signal is indicated as a Chinese character Category Code and/or a phrase Category Code.

The recognition result of the received key signal is indicated as the Chinese character Category Code and/or phrase Category Code, which is a preliminary judgment of the received key signal, that is, it is initially recognized that the received key signal is due to the user input keys related to Chinese character Category Codes and/or phrase Category Codes.

If the received key position signal includes the key position signal of the reserved key position, and the received key position signal is a combination of the key position signal of a target key position and the key position signal of the reserved key position, the recognition result of the obtained key signal is indicated as the signal of the Basic Components for querying the target key; the target key is the key used to represent a component Category Code. Then, display the Basic Components corresponding to the component Category Code represented by the target key. The Basic Component is the Chinese character Basic Component, which is the basic shape structure of a Chinese character.

If the received key position signal includes the key position signal of the reserved key position, and the first key position signal in the received key position signal is the key position signal of the reserved key position, then the recognition result of the signal is indicated as a pinyin input signal, where the key signal corresponding to the key input after the reserved key is recognized as pinyin, then the Chinese character or phrase corresponding to the pinyin is displayed.

Determining the Chinese character and/or phrase represented by the recognized Chinese character Category Code and/or phrase Category Code may specifically include:

according to the key combination corresponding to the received key signal, in the Chinese character category input method table and the phrase input method table respectively search for the Chinese character Category Code and phrase Category Code that are consistent with the key combination, and determine the Chinese character and/or phrase represented by the searched Chinese character Category Code and/or phrase Category Code. Among them, the Chinese character category input method table records correspondence between Chinese characters and Chinese character Category Codes, the corresponding relation between phrase and phrase Category Codes is recorded in the phrase input method table.

The Chinese character Category Code of each Chinese character can be generated in advance to obtain the Chinese character category input method table.

Among them, the Chinese character Category Code of the Chinese character is generated by the following method: Determine the number of components of the Chinese character to be generated for the Chinese character Category Code, and the number of components is the number of Basic Components contained in the Chinese character to be generated; if the number of components is 1, the component Category Code of the unique Basic Component and part or all of the stroke Category Code of the unique Basic Component generate the Chinese character Category Code; if the number of components is 2, then according to the two component Category Codes and part or all of the stroke Category Code of the second Basic Component of the Chinese character, the Chinese character Category Code of the Chinese character is generated; if the number of components is greater than or equal to 3, the Chinese character Category Code is to be generated according to all of the Basic Component Category Code of the Chinese character.

Before determining the number of components of the Chinese character for which the Chinese character Category Code is to be generated, you can first read the component Category Code contained in each Basic Component to use for the following steps when generating the Chinese character Category Code.

Preferably, the Shape Code can be generated for each Chinese character in advance to create Shape Code table in which the Shape Code of each Chinese character are stored, Chinese character Shape Code is the combination of the double-alphabet of the corresponding Basic Components contained in the Chinese character, the corresponding double-alphabet of the Basic Component is the Basic Components Shape Code, each of the Shape Code including a component Category Code and a component category internal code. Read the component Category Code of each component to get the Basic Component Category Code. By traversing Chinese character Shape Code table, according to the method of generating Chinese character Category Codes introduced above, the Chinese character Category Code of each Chinese character can be generated.

The Shape Code of the Basic Components can be read from the Shape Code table of the Basic Components.

Construct the Shape Code table of the Basic Components: For all Basic Components according to the shape classification, get multiple Basic Component shape categories; take a different first alphabet as component Category Code for each Basic Component shape category, and for each Basic Component shape category, use different second alphabet as the Basic Component category internal code to get Shape code for each Basic Component, one Shape Code including a component Category Code and a component category internal code; according to Shape Code of each Basic Component to generate ordered Shape Code table for Basic Components.

As a preferred embodiment, double-alphabets are preferred for Shape Code of Basic Components, that is, both the component Category Code and the component category internal code are letters.

Can be based on Basic Component Shape Code (The Shape Code of a Basic Component is referred to as the component Shape Code), query the corresponding part or all of the stroke Category Codes in the Basic Component stroke Category Code table; among them, for Basic Components whose strokes do not exceed the preset number, the Basic Component stroke Category Code table records the Basic Component Shape Code with correspondence relationship of all stroke Category Codes of the Basic Component; for Basic Components whose number of strokes exceeding the preset number, the stroke Category Code table records the component Shape Code of the Basic Component and the corresponding relationship of the preset number of stroke Category Codes of the Basic Component (that is, partial stroke Category Codes).

In one embodiment, according to stroke type of Basic Components, the corresponding stroke Category Code for each stroke is configured, where: for the strokes in the component type strokes except for the folding pen strokes, the configured stroke Category Code is the component Category Code of the stroke; for the folding pen strokes in the component type strokes and non-component type strokes, the configured stroke Category Code is the designated key position; the component type strokes are themselves Basic Component strokes, non-component type strokes are not themselves Basic Component strokes. The designated key position may be one or more specific key positions determined according to needs.

All Basic Component Shape Codes used in constructing the shape table of Basic Components include those used to generate simplified characters, traditional characters, Chinese characters in Japanese, and Chinese characters in Korean.

The phrase Category Code of each phrase can be generated in advance to obtain the phrase input method table.

Among them, the phrase Category Code of the phrase is generated by the following method: determine the number of characters of the phrase to be generated; if the number of characters is 2, then according to part or all of the component Category Codes of each Chinese character in the phrase to generate the phrase Category Code of the phrase; if the number of characters is greater than or equal to 3, the phrase Category Code of the phrase is generated according to the first component Category Code of each Chinese character in the phrase to be generated.

When displaying the determined Chinese characters and/or phrases, the determined Chinese characters and/or phrases can be displayed in sequence according to the frequency of use of the determined Chinese characters and/or phrases.

In one embodiment, one of a variety of virtual keyboards may be displayed in response to a user's input instruction. The virtual keyboard includes a plurality of virtual keys, and the virtual keys correspond to the key positions one-to-one, and the virtual keys are used to display user some or all of Basic Components of the Basic Component shape category of the corresponding key position, a variety of virtual keyboards can be switched based on the user's selection instructions, Basic Components shape category is one-to-one correspondence with the key positions. For example, a default virtual keyboard can be displayed to the user, and a selection prompt can be provided at the same time, so that the user can select other virtual keyboards as needed.

In the embodiment of the present invention, standards are used to define Basic Components, and there is no phenomenon of random disassembly of characters. Basic component Shape Code is simple and clear, a Shape Code double-alphabets corresponds to a Basic Component. Chinese character Shape Code has no repetitive code. The coding includes all the Basic Component information in a Chinese character, there is no duplicate code, and it is intuitive and simple. Chinese character category input method is easy to remember and use. Component category uses shape as the only classification standard, it does not involve sound and character meaning, and it is as intuitive and simple for users who know Chinese characters and those who do not know Chinese characters. The grouping of components in the key makes the components easier to remember. The typing method is simple, and you can start typing with almost zero learning. Basically, this input method does not require special learning when getting started, and the entire input process is very natural without many rules. Blind typing and fast typing can be realized. As you become familiar with the components, the input speed will become faster and faster, which can achieve the speed of blind typing and professional typists.

According to the "GB13000.1 Character Set Chinese Character Components Specification for Information Processing" and its attached "Chinese Character Basic Components Table", the standard defines 560 Chinese character Basic Components as the basic structure of Chinese characters in a standard way. The 20902 Chinese characters in the GB13000.1 character set are all composed of these components.

According to the above Chinese character component specification, component is a character structure unit composed of strokes and having the function of assembling Chinese characters. The Basic Component (ie the Basic Component of Chinese character) is the smallest component that is no longer split, divided into basic character-forming component (itself is a character, referred to as character-forming component) and basic non-character component (not a character itself, referred to as non-character component). Chinese characters can be composed of Basic Components. With the standards for Basic Components, the core issue of Chinese character encoding and input has shifted to how to use these 560 Basic Components, analyzing and categorizing them will help to use them better.

This invention classifies the 560 Basic components according to their shape characteristics of the Basic Components. For this reason, enter up the concept of a shape category guiding component (that is, the category guiding component below, or the guiding component for short), that is, a component can guide or by representative a set of components according to their shape characteristics. Through a certain amount (such as more than twenty) of these guiding components, the shape characteristics of all components can be expressed. With guiding components as the standard of the category, all components are classified into these guiding components, and you can effectively classify 560 Basic Components according to the shape of the components.

After repeated test of the invention, one guiding components implement example determined the following 25 shape category guiding components: "十, 乙, 弓, 三, 人, 二, 一, 丶, 口, 丁,厂, 木, 纟, 又, 日, 田, 月, 八, 七, 丿, 忄, 刀, 乂, 彐, 丨." Most of them are the most commonly used character components. The shape of these character components is relatively stretched full and representative. Since they are almost all commonly used characters and people are relatively familiar with them, they are very suitable as guiding components. There are five main stroke components among them, which can be used in places that need to use the strokes.

In order to mark and store each of the above 560 Basic Components in a computer, in consideration of applications such as keyboard typing, it should be very convenient if they can be represented by Roman letters. However, a total of 26 letters from A to Z, including only 52 in total even with lower cases, which is certainly not enough. With two letters, there are 26×26=676 combinations, which can meet the needs of 560 components, and there are more 116 spaces for expansion. The utilization rate of two-letter resources is quite high, at 83% (560/676).

Figure 2:
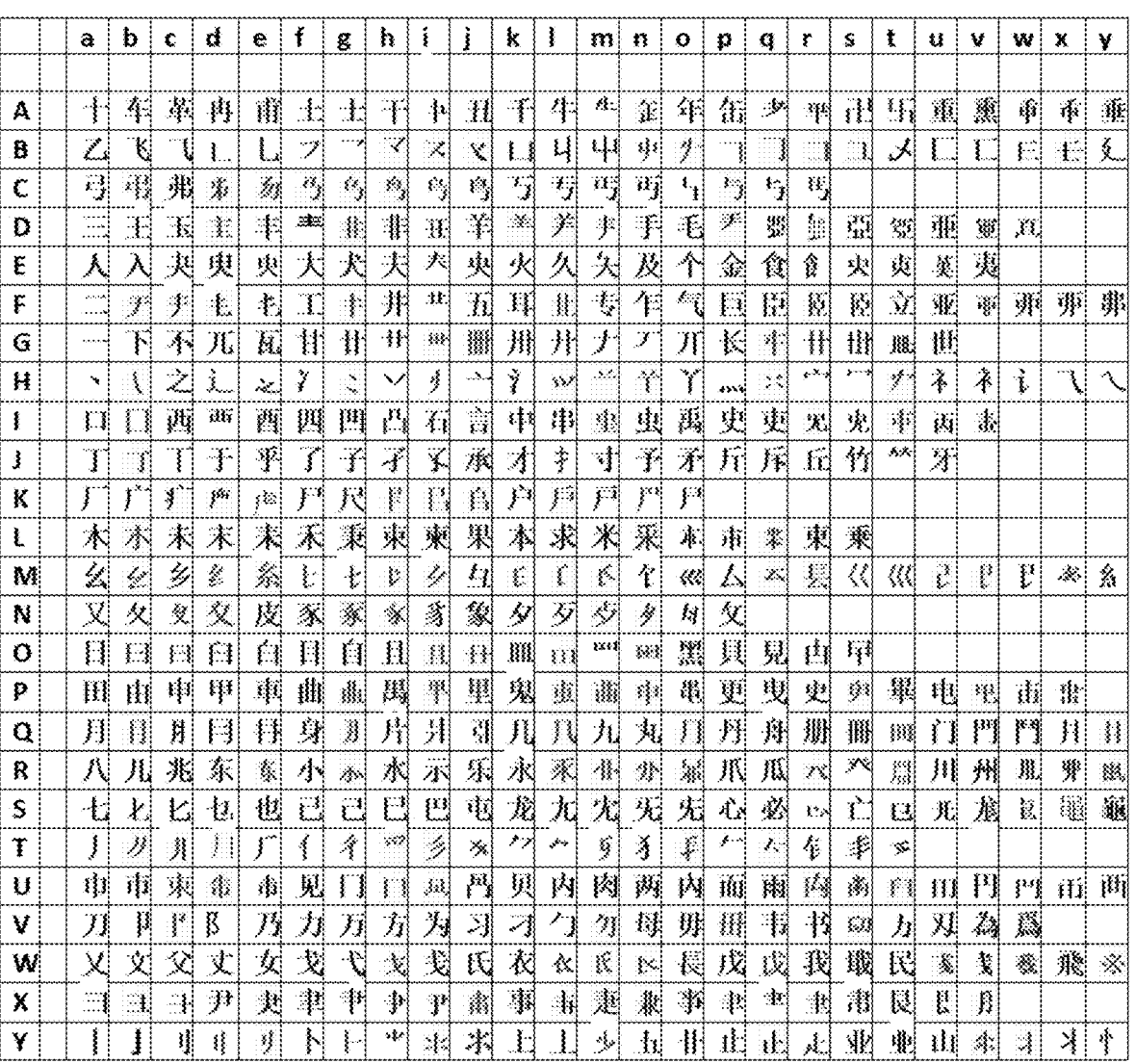
FIG. 2 is a schematic diagram of the Shape Code table of the Chinese character Basic Components according to an embodiment of the present invention.

The Basic Component based on the embodiment of the present invention, guiding components by shape category classification and use of double-alphabet symbol inventive concept, an embodiment of the present invention can construct and store Chinese character Basic Component Shape Code table as shown in FIG. 2, abbreviated as Basis Component Shape Code table or component Shape Code table. The component Shape Code table in Figure use double-alphabet symbol, each Chinese character Basic Component (Basic Components or components for short) is orderly distributed according to the shapes of components, thereby generating an ordered code table, that is, constructing the Chinese character Basic Component Shape Code table. FIG. 2's component shape table has 25 rows, each row represents a Basic Component category divided by shape, which is Basic Component shape category, arranged from top to bottom, coded in a capital letter, as the first letter in the component double-alphabet Shape Code, it is called the component Category Code. The first component of each row is also called the category guiding component, it can be together with the corresponding component Category Code to represent the category. The other components in the row are arranged according to the number of strokes and the order of the strokes. There are 25 columns in FIG. 2 (that is, columns a to z in FIG. 2), each column represents a specific Basic Component in a category, coded by a lowercase letter, as the Basic Component shape internal code. In FIG. 2, the overall shape of the components in each category is relatively similar, this is one of the ideas in this input method.

The Shape Code table of Chinese character Basic Components in FIG. 2 defines all basis component Shape Code. For example, in FIG. 2, The "A" line is called "A" component category, also known as "十" component category. The first component in the row is the "十" component itself, which is in the "a" column, so its code number is "Aa". The component "人" is in "f" column of "E" category ("人" component category), its code is "Ef".

Since the non-character components used for traditional characters and Japanese and Korean Chinese characters may not be used together with those used for simplified characters, they are listed after the other non-character components in each row in FIG. 2, and these non-character components used for traditional characters and Japanese and Korean characters are re-arranged according to the number of strokes and the order of strokes.

The components of several categories in FIG. 2 are listed below.

"人" category (E category): "人入夬臾犬夫　夾火久矢及个金倉食　裏"
"木" category (L category): "木水未术禾未乗束　東果本求米采束乗"
"日" category (O category): "日曰白目自且血見由甲　"

In another embodiment of the present invention, in the Basic Components of the component shape table, within a large frame of 26 rows and 26 columns, select different shape category guiding components to classify components.

In summary, in the Basic Component shape code table of the embodiments of the present invention, you can use different first alphabets (such as uppercase letters) as the component Category Codes, and use different second alphabets (such as lowercase letters) as the component category internal codes for each category, to obtain each Basic Component Shape Code (for example, a double-alphabet code composed of uppercase and lowercase letters). What kind of layout for Basic Component Shape Code table can be pre-configured in the Chinese character input system of the embodiment of the present invention before using.

Based on Basic Component Shape Code, Chinese characters can be coded according to the specification.

First, according to the "GB13000.1 Character Set Chinese Character Component Specification for Information Processing", Chinese characters are divided into Basic Components. Due to the regulations, the Basic Components shall not be disassembled anymore, and can be dismantled when they are separated or connected, and they are not dismantled when they are crossed. Therefore, the steps for dismantling are relatively simple and clear. For example, '叨 " is divided into '口 " and '月 ". '北 " is divided into '北 " and "一 ". When encountering individual characters that have two or more splitting methods, the number of components should be as few as possible when splitting, first split separated, then split connect, then, the first component should have as many strokes as possible.

After splitting the character into Basic Components, the corresponding Basic Components can be found in Basic Component Shape Code table. According to the "GB13000.1 Character Set Chinese Character Stroke Order Specification", and the stroke order of the Basic Components of the character, combine the corresponding Basic Component Shape Code to get the character's Shape Code.

The following is based on FIG. 2. Basic component Shape Code table is illustrated with an example.

The character '杆 " is split into two Basic Components, " 木 " and "干 ". Their Shape Code is "La" and "Ah". Among them, the strokes of '木 " come first, so the '木 " Shape Code comes first, so that the Shape Code of the character " 杆 " is "LaAh".

'人 " contains only one Basic Component '人 " (Ea), therefore the code of '人 " (ie Shape Code) is "Ea".

"想" is divided into three components "木" (Shape Code is "La"), "日" (Shape Code is "Of") and "心 " (Shape Code is "Sp"), according to the stroke order of the three Basic Components, the code of "想" is "LaOfSp".

"云 " is broken into "一 " (Shape Code is "Ga") and " 厷 " (Shape Code is "Mq"), the encoding of "云 " is "GaMq".

"南 " is broken into "十", "冂","䒑" and "十 ", the four Basic Component Shape Codes are "Aa", "Ug", "Hm", and "Aa", then the code of "南 " is "AaUgHmAa".

When the sequence of stroke order jumps between two components of a character, the order of the first stroke shall prevail. Take the character "囚 " as an example. "囚 " is split into "囗 " ("Ia") and "大 " ("Ef") components. According to the strokes, you need to finish writing "人 " and then write the last horizontal line of "丨丨". According to the first stroke, "囗 " comes first, so the code of "囚 " is "IaEf". According to the above coding method, all of the 20902 Chinese characters and traditional characters and Japanese and Korean Chinese characters in the GB13000.1 character set can be coded to obtain complete Chinese character Shape Code. The code length of each character varies from two alphabets of a single Basic Component to multiple alphabets.

Chinese character Shape Code in the embodiment of the present invention includes complete information of all the Basic Components of Chinese characters, therefore, it is complete, holographic, single and bidirectional. The code of each character is unique, there is no repeated code, the code can be derived from the character, and the character can be derived from the code. The Chinese character encoding in the embodiment of the present invention can be used in various Chinese character input, sorting and searching occasions.

Chinese character Shape Code table of an embodiment of the present invention is shown in Table 1, in which only a few Chinese characters and corresponding Shape Code of Chinese characters are listed exemplarily.

TABLE 1

| Chinese character | Chinese character Shape Code |
| --- | --- |
| 人 | Ea |
| 云 | GaMq |
| 想 | LaOfSp |
| 杆 | LaAh |
| 南 | AaUgHmAa |
| 囚 | IaEf |

The Basic Components of Chinese characters include 14 stroke components, of which "一 " is both a stroke and a character, and it belongs to the character component. The other 13 stroke components of the Basic Components are non-character components. All folding pen strokes are divided into "B" stroke category. Stroke components meet the conditions of components (ie, Chinese character Basic Components) and need to be able to exist independently, and cannot be separated from a cross-stroke component. There are 32 strokes, except for 14 stroke components (ie themselves are the strokes of Basic Components or component type strokes), there are 18 folding pen strokes (that is, non-component type strokes) that do not have corresponding stroke components.

An embodiment of the present invention divides the strokes into 5 categories, using the stroke Category Code "G", "Y", "T", "H", and "B" to represent, as shown in FIG. 3, 32 strokes are classified into five stroke categories, corresponding to 5 stroke Category Codes. That is: according to the stroke type of the Basic Components, configures the stroke Category Code corresponding to each stroke, where: for the component type strokes (itself is Basic Component strokes) except for the folding pen strokes, the configured stroke Category Code is the component Category Code of the stroke, respectively as FIG. 3 correspond to "G", "Y", "T", and "H" strokes; for the folding pen strokes in the component type strokes and the non-component type strokes (themselves are not Basic Component strokes), the configured stroke Category Code is the designated key position (such as "B" in FIG. 3). Component type strokes are stroke components, and non-component type strokes refer to 18 folding pen strokes without corresponding stroke components.

Table 2 is an example of the Basic Component stroke Category Code table of the present invention. As shown in Table 2, the Basic Component stroke Category Code table stores the Shape Code of the Basic Components and the corresponding part or all of the stroke Category Codes, where if the number of strokes of Basic Components does not exceed three (ie the preset number), record the correspondence relationship between the Basic Component Shape Code and all of the stroke Category Codes, for those Basic Components with more than three stroke, record the correspondence relationship between the Basic Component Shape Code and the Category Codes of the first three strokes of the Basic Component.

TABLE 2

| Basic component Shape code | Stroke Category Code of the first three strokes |
|---|---|
| Aa | GY |
| Ab | GBG |
| Ac | GYY |
| Ad | YBG |
| . . . | . . . |
| Ea | TH |
| Eb | TB |
| Ec | BGT |
| Ed | TYB |
| . . . | . . . |

The stroke Category Code table of the first three strokes (ie Basic Component stroke Category Code table) of the Basic Components, will be used in the implementation of the input method software system of the embodiment of the present invention. The first column in Table 2 is the Basic Component Shape Code, the second column is the stroke Category Code of the first three strokes of the component.

With unique, full-information Chinese character Shape Code without repeated codes, the input of Chinese characters into the computer has a solid foundation.

Chinese character Shape Code is a holographic code, including the complete information of all the components in the Chinese character. For typing, as long as the character can be recognized, it is not necessary to use all the information of the character.

In order to enable users to have the best experience of inputting Chinese characters, the embodiment of the present invention on the basis of the Shape Code of Chinese character, further use the component Category Code (The first letter in the component Shape Code) and the stroke Category Code to generate Chinese character component and stroke Category Code dedicated to inputting Chinese characters, abbreviated as Chinese character Category Code.

According to an embodiment of the present invention, first, find the Shape Code of Chinese character (that is, the Chinese character for which the Chinese character Category Code is to be generated), and count the number of the components in the Shape Code. Then, read out the component Category Codes corresponding to all components; if a character contains only one Basic Component (that is, the only Basic Component), then read the component Category Code of the component, and read the first three strokes of the component and the corresponding stroke Category Codes. If the component contains more than three strokes, only the stroke Category Code of the first three strokes will be read (that is, component of the stroke Category Code), if the component has only one, two or three strokes, you only need to read the stroke Category Codes of all the strokes it contains (that is, all the stroke Category Codes); if one character contains only two Basic Components, then read the component Category Codes of the two components, then read the first two strokes and the corresponding stroke Category Codes of the second component. If the second component contains more than two strokes, then read the first two stroke Category Codes (that is, part of stroke Category Codes), if the second component contains only one or two strokes, enter the stroke Category Codes of all strokes of the component (ie all stroke Category codes); if a character contains three or more Basic Components, read the component Category Codes of all the Basic Components. Combine the component Category Code of the Chinese character with the read stroke Category Code (if only the component Category Code is read, combine the read component Category Code) to form the Chinese character Category Code of the Chinese character.

Based on the above steps, the Chinese character Category Codes of the embodiments of the present invention are introduced as examples below, so as to further illustrate the corresponding Chinese character Category Codes to be input by the user and to be processed by the software.

Based on FIG. 2 Basic Component Shape Code table, the following is explained.

The character '想 ' is split into three components '木 ' (Shape Code is "La"), '日 ' (Shape Code is "Of"), and '心 ' (Shape Code is "Sp"). According to the stroke order of the three Basic Components, the component Category Codes corresponding to the three components are arranged in the order of '木', '日', '心', ', and the Chinese character Category Code of the character '想 ' is obtained as "LOS".

The character '南 ' is split into '丨 ' (Aa), '冂 ' (Ug), " ᄼᅩᄼ " (Hm) and '十 ' (Aa). The corresponding Chinese character Category Code is the Category Code of each component (that is, the first capital letter in the Shape Code of the component) according to the combination of stroke order, that is "AURA".

The character '人 ' contains only one Basic Component '人 '. Therefore, the component Category Code of the '人 ' component itself is "E". Then, the stroke Category Code corresponding to the only two strokes of '人 ' is "TH". Then, the Chinese character Category Code of '人 ' is "ETH", Which is the combination of the component Category Code of the only Basic Component and the stroke Category Codes of the only two strokes.

The character " 杆 " is split into two Basic Components, " 木 " and " 干 ". Their Shape Code is "La" and "Ah", Therefore, the component Category Codes corresponding to the two components themselves are "LA". The stroke Category Code corresponding to the first two strokes of the second component " 干 " is "GG". Then, the Chinese character Category Code of " 杆 " is "LAGG", That is, the combination of the component Category Codes of the two Basic Components and the stroke Category Codes of the first two strokes of the second component.

" '云 " is split into " 一 " and " ᄼᅩᄼ " The component Category Code corresponding to the two components is "Ga" and "Mq". Then, the stroke Category Code corresponding to the first two strokes of the second component " ᄼᅩᄼ " is "GB". Then, the Chinese character Category Code for " 云 " is "GMGB".

As an embodiment of the present invention, the input method based on Chinese character component and stroke Category Code (abbreviated as Chinese character Category Code) is called the Chinese character category input method, that is, the Chinese character input method in the embodiment of the present invention.

The input method software handles tens of thousands of different Chinese characters, and a systematic software method is needed to convert a Chinese character Shape Code into a Chinese character Category Code.

Figures 4, 5:
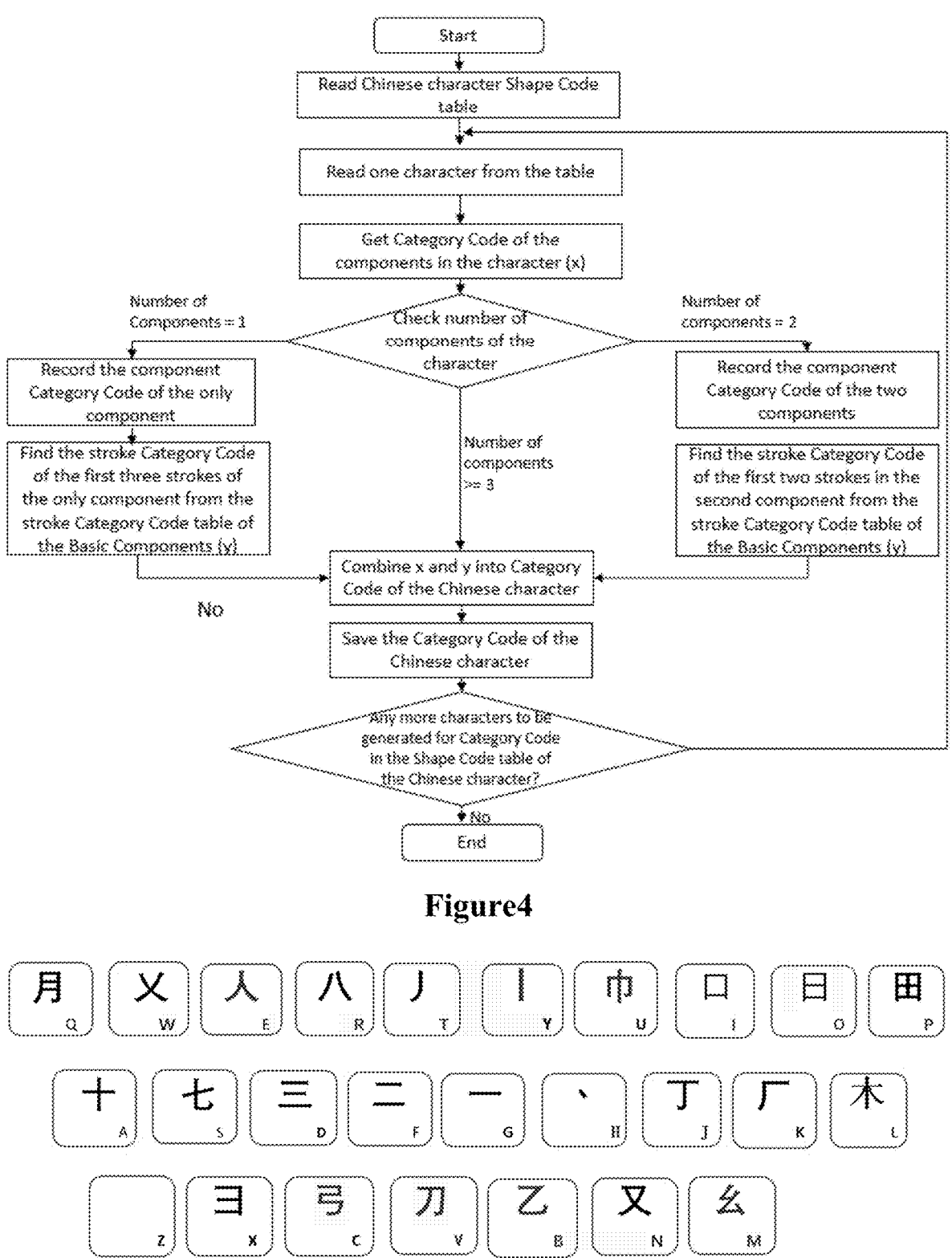
FIG. 4 is a schematic diagram of the conversion process between Chinese character Shape Code and Chinese character Category Code according to an embodiment of the present invention.
FIG. 5 to FIG. 8 are various keyboard diagrams of the embodiments of the present invention.

As an embodiment of the present invention, FIG. 4 is a schematic diagram of the conversion process between Chinese character Shape Code and Chinese character Category Code. As shown in FIG. 4, the process includes:

Read in the Chinese character Shape Code table;

From Chinese character Shape Code table (the format of the Chinese character Shape Code table is as shown in Table 1), take out a character;

Take out the component Category Codes of the components contained in the character (ie each capital letter in the Chinese character Shape Code), denoted as x;

Judge the number of components of Chinese characters;

If the number of components is 1, record the component Category Code of the unique component, and then from the Basic Components stroke Category Code table (The form of the Basic Component stroke Category Code table is shown in Table 2), search for the first 3 stroke Category Codes of the unique component, denoted as y, where, if the number of strokes of the unique component is less than or equal to 3, search for all its stroke Category Codes;

If the number of components is 2, record the component Category Codes of the two components, and then look up the first 2 stroke Category Codes of the second component in the Basic Component stroke Category Code table and record it as y;

No need to read any stroke Category Code when the number of components is 3 or more;

Synthesize x and y into Chinese character Category Codes; among them, when synthesizing Chinese character Category Codes: For the case of the number of components being 1, x is the component Category Code of the unique component recorded, and y is the first 3 stroke Category Codes of the unique component; when the number of components is 2, x is the component Category Code of the two components recorded, and y is the first 2 stroke Category Codes of the second component; for the case of the number of components being 3, there is no y, then just set x itself by combining the Category Code of each component;

Save the generated Chinese character Category Code and the corresponding Chinese character into the Chinese character category input method table;

Judge whether there are any characters still to be generated in the Chinese character Shape Code table for the Chinese character Category Code, if there are, then return to the steps to take out a character from the above-mentioned sub-Chinese character Shape Code table (The format of the Chinese character Shape Code table is as shown in Table 1); if not, the process ends.

Through the above process, the Shape Code of all Chinese characters can be converted into the corresponding Chinese character Category Code. The converted Chinese character Category Code can be stored in the first column of the Chinese character category input method table shown in Table 3 for use by the Chinese character input system of the embodiment of the present invention.

TABLE 3

| Chinese Character Category Code | Chinese character usage frequency | Chinese character |
|---|---|---|
| . . . | . . . | . |
| LOS | 0.0003 | 想 |
| AUHA | 0.0002| 南 |
| ETH | 0.005 | 人 |
| LAGG | 0.0001 | 杆 |
| GMGB | 0.001 | 云 |
| . . . | . . . | . . . |

The Chinese character category input method software system of the embodiment of the present invention (that is, the Chinese character input system of the embodiment of the present invention) determines how to display the selectable characters and the final input character according to the Chinese character category input method table. In addition to the Chinese character Category Code in the first column of the Chinese character category input method table, the second column is the frequency of use of the Chinese character, and the third column is the Chinese character itself. The frequency of use of Chinese characters can be based on public available statistics. The higher the frequency of use of a character, the higher it ranks among the selectable characters. The frequency of use listed in Table 3 is only exemplary data.

The Chinese character input system of the embodiment of the present invention compares the user's input letter with the Chinese character Category Code in the Chinese character category input method table, so as to find the character input by the user.

The embodiments of the present invention try to simplify the use of the user terminal. After the user installs the Chinese character input method software (ie, the Chinese character input system in the embodiment of the present invention) and selects this method, the user can input Chinese characters on a common computer English keyboard or virtual English keyboard.

Users need to be familiar with the Basic Component Shape Code table about which component belongs to which component Category Code (letter), and then enter the corresponding letters for the Chinese character in the keyboard according to the input steps of the Chinese character category input method. The Chinese character input system of the embodiment of the present invention will convert the letters input by the user into Chinese character according to the Chinese character Category Code.

From a user's point of view, the following is the steps the user takes to input a Chinese character using the Chinese character category input method of the embodiment of the present invention: First, the Chinese character is split into Basic Components according to the method described in the Chinese character splitting method introduced above. Then, in order, find each component and the component Category Code (that is, the letter in the first column of the row) to which it belongs in the Basic Component Shape Code table and enter the component Category Code from the keyboard. If the total number of components of the character is only one or two, additional stroke Category Codes are required. In the case of one component, find the stroke Category Codes of the stroke components corresponding to the first three strokes in the Basic Component shape code table and enter them. If there is no corresponding stroke component, enter "B" stroke Category Code. When there are two components, find the stroke component categories of the stroke components corresponding to the first two strokes of the second component in the Basic Component Shape Code table and type them in. If there is no corresponding stroke component, enter "B" stroke Category Code. After the above steps, the input character is generally displayed as the first selected character. The user presses the blank key or the number "1" to complete the input of the character. If there is a repetitive code, it may be regarded as a non-first choice. The selected character is displayed, and each Chinese character has a corresponding serial number (usually a number). At this time, the user only needs to select the number corresponding to the Chinese character to be input.

Because the Chinese character category input method only uses the component Category Code (the first letter) of the Chinese character Shape Code and the stroke Category Code in the code, so the letters entered by this input method are no longer fully informative and non-duplicated. However, the embodiment of the present invention can control the code repetition rate at a very low level, and basically does not affect the blind typing.

Figure 6:
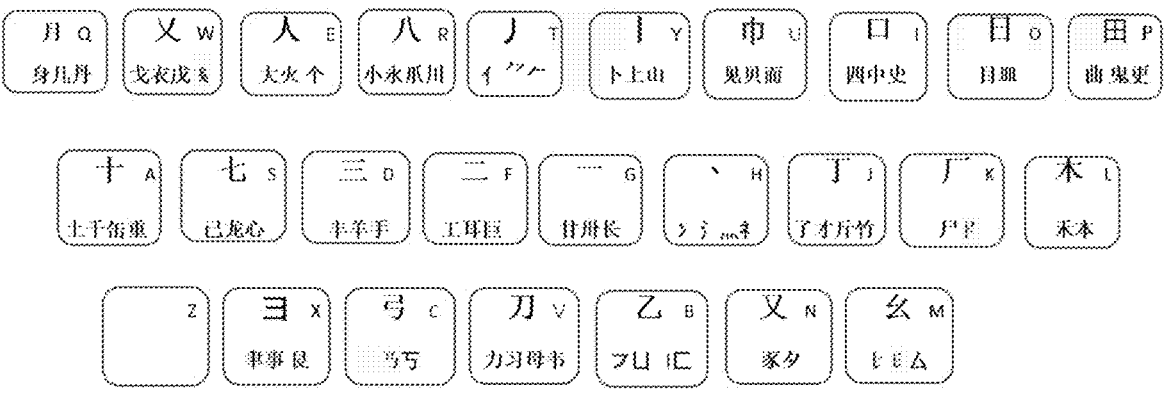
Figure 7:
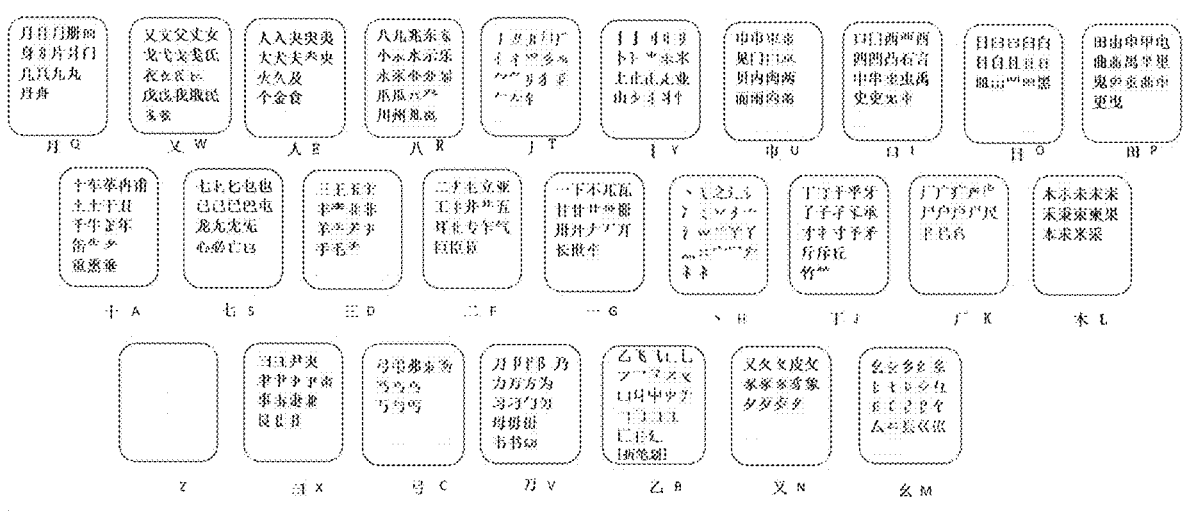
Figure 8:
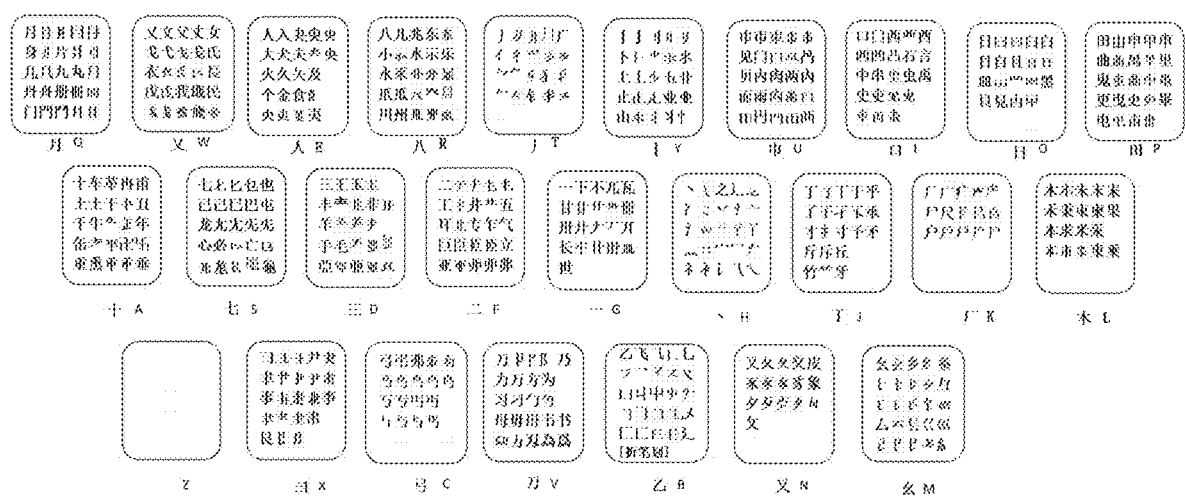

Due to the embodiment of the present invention the component Category Code in the Basic Components Shape Code table exactly matches the letters on the keyboard. In order to facilitate the user to remember the component Category Code where each component is located, the Chinese character input system of the embodiment of the present invention also generates FIG. 5 to FIG. 8, the more intuitive component category keyboard learning diagram, among which, FIG. 5 simplified keyboard diagram for input of Chinese characters, only included category guiding component and component Category Code in each key, the user needs to be familiar with the content first, and the user can type according to only this component through the association and the component prompts within the key. FIG. 6 is the keyboard diagram of the core components for inputting Chinese characters, each key includes several core Basic Components, and the user can type according to these components through association and component prompts within the key. FIG. 7 enters a detailed keyboard map for Chinese characters (simplified characters), which includes the Basic Components used in simplified characters, but does not include components that are only used in traditional characters and Japanese and Korean Chinese characters. In FIG. 7, in order to facilitate memorization, the components in each key that are already quite similar can be subdivided into several sub-groups, and several more similar components are placed in a sub-group and arranged in the same row in the key, such as the " 人 " key's (which is "E" Key) second line includes " 大, 犬, 夫, 夨, 尖". A few approximation components in this line consists of a sub-group, the first component in the sub-group is called shape category sub-guiding component. FIG. 8 enters detailed keyboard diagrams for Chinese characters (simplified and traditional), which includes Basic Components used in simplified characters, as well as components used in traditional characters and Japanese and Korean Chinese characters. The number of components is the same as the number of components in the Basic Component Shape Code table.

In one embodiment, FIG. 5 to FIG. 8 does not appear completely on the display screen of the Chinese character input system of the embodiment of the present invention, and is only used to help users familiarize themselves with components and component categories.

In another embodiment, in response to a user's input instruction, one of the multiple virtual keyboards can be displayed, and the multiple virtual keyboards can be switched based on the user's selection instruction. Basic component shape category corresponds one-to-one with the keys, where each form of the virtual keyboard corresponds to a keyboard illustration of the above FIG. 5 to FIG. 8.

In an embodiment of the present invention, in the Shape Code, Chinese character Category Code, and the input keyboard, the Z key (i.e. reserved key position) is deliberately reserved for special purposes.

Figure 9:
FIG. 9 is a schematic diagram showing components in a component category according to an embodiment of the present invention.

When the user is not familiar with the components, if the user wants to check which Basic Components a certain keyboard letter corresponds to, he can input the letter first, and then press the Z key. For example, press "R" Key (ie the target key position) and then press the "Z" key (ie reserved key position), the Chinese character input system of the embodiment of the present invention will display in a display space all the Basic Components included in the component category "R", such as shown in FIG. 9, it shows the prompt key function of an embodiment of the present invention: displaying components in a component category. The user's keyboard letter input before the Z key will be cancelled, and the input before or after this will remain the same. That is, if the received key position signal is a combination of the key position signal of a target key position and the key position signal of the reserved key position, the recognition result of the received key position signal indicates that it is used to query the target key position, and display the Basic Components of the category corresponding to the component Category Code represented by the target key.

The embodiment of the present invention also supports phrase and sentence input, and there is no limitation on the number of keystrokes. Therefore, the user can enter without restriction until it is found.

When entering a phrase or sentence containing three or more characters, follow Basic Components Shape Code table, enter the component Category Code where the first component of each character is located (that is, the first component Category Code of the character) until it is found. For example, if you enter " 林业部 ", the user only needs to enter "LYF" (According to FIG. 2, the " 木 " in " 林 " is located in line "L", so the first component Category Code of " 林 " is "L"; " 业 " is located in line "Y", so the first component Category Code of " 业 " is "Y"; "立" in " 部 " is located in line "F", so the first component Category Code of " 部 " is "F". Then the Chinese character input system of the embodiment of the present invention will display "林业部" and other keys "LYF" related characters and phrases for users to choose.

When entering a two-character phrase, enter the component Category Code of the first two components of each character, that is: for each character in the phrase, if the number of components of the character is greater than 2, you only need to enter he first two component Category Codes (partial component Category Codes), if the character has only one component or two components, you need to enter the component Category Codes (all component Category Codes) of all the components of the character.

Based on the above rules, the embodiment of the present invention can pre-generate the phrase Category Code for each phrase, that is, determine the number of characters in the phrase to be generated; if the number of characters is 2, then according to part or all of the component Category Codes of each Chinese character in the phrase to be generated, generate the phrase Category Code of the phrase; if the number of characters is greater than or equal to 3, generate the phrase Category Code of the phrase according to the first component Category Code of each Chinese character in the phrase to be generated. Generate a phrase input method table according to the phrase Category Code of each phrase.

When the user enters a Chinese character, according to the key combination input by the user (that is, the key combination corresponding to the key signal received by the Chinese character input system of the embodiment of the present invention), search in the phrase input method table to match the key combination of the phrase Category Code for, for example, the user enters "LYF" key combination, then the Chinese character input system of the embodiment of the present invention can find " "林业部" " and other "LYF" related phrases by searching the phrase input method table to display to the user. At the same time, the Chinese character input system of the embodiment of the present invention will also search the Chinese character category input method table to find the Chinese character Category Code as "LYF, and the result is also displayed to the user. Users can choose the Chinese character or phrase they want to enter according to their needs.

At the very beginning of a character or phrase input, if the key input by the user is the "Z" key (that is, the reserved key), it enters the pinyin mode that comes with the Chinese character input system of the embodiment of the present invention, that is, the recognition result of the signal indicates the pinyin input signal, and the key position (letter key) input after the "Z" key is recognized as the Chinese pinyin of the character. When the user completes the pinyin input, it will automatically return to the normal input mode. This function will help users to input individual characters whose shapes were not remembered.

In one embodiment, after the user uses the pinyin mode to input a character, the screen may also display the Chinese character Category Code of the character for the user to use it next time.

In one embodiment, in the process of inputting a character, the sequence of the selected characters may be based on the frequency of use of Chinese characters according to public statistics. The higher the frequency of use of a character, the more it ranks in the front, so the commonly used characters are relatively ranked in the front. Some characters only need to enter a component and they will be ranked first, and you can enter the character directly by hitting the space bar. In the Chinese character input method of the embodiment of the present invention, there are 25 such one-key characters, for example, 的 (O), 了 (J), 我 (W), 人 (E).

According to the frequency of character use, some characters only need to be pressed twice. There are about 500 commonly used two-key characters. Some characters can be entered by pressing three keys. There are about a few thousand of these characters. Since 500 commonly used characters appear frequently in the article, the embodiments of the present invention can generally realize that the average number of keystrokes (excluding the blank key) of a single character is between two and three times. The average number of keystrokes for phrases and sentences is even less, about 1 key per character.

The invention supports both simplified and traditional Chinese characters. The simplified and traditional Chinese characters have their own Shape Code and Chinese character Category Code, therefore can be input at the same time without conversion.

Figure 10:
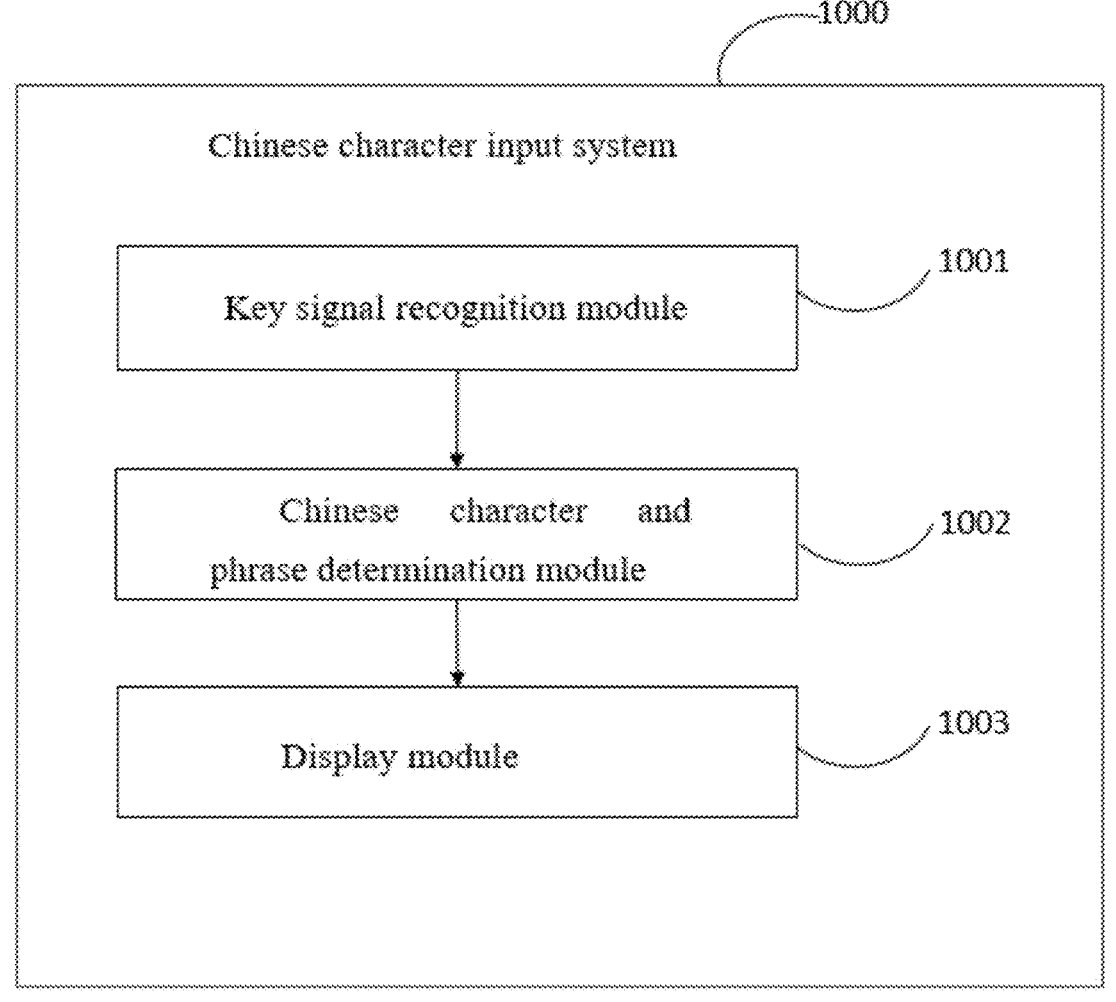
FIG. 10 is a schematic diagram of main modules of a Chinese character input system according to an embodiment of the present invention.

FIG. 10 is a schematic diagram of the main modules of the Chinese character input system according to an embodiment of the present invention. As shown in FIG. 10, the Chinese character input system of an embodiment of the present invention 1000 mainly includes: key position signal recognition module 1001, Chinese character and phrase determination module 1002, and display module 1003.

Key signal recognition module 1001, used to identify the received key signal;

Chinese character and phrase determination module 1002, used to determine the Chinese character and/or phrase represented by the recognized Chinese character Category Code and/or phrase Category Code when the recognition result of the received key signal indicates the Chinese character Category Code and/or phrase Category Code; among them, the Chinese character Category Code is the combination of the component Category Code or the combination of the component Category Code and the stroke Category Code, used to represent Chinese characters; the phrase Category Code is the combination of component Category Codes, used to represent phrases;

Display module 1003, used to display the determined Chinese characters and/or phrases.

Key signal recognition module 1001 is also used for:

Identify whether the received key position signal includes the key position signal of the reserved key position. If the key position signal of the reserved key position is not included, the recognition result of the received key position signal is indicated as the Chinese character category code and/or phrase Category Code.

Key signal recognition module 1001 is also used to: if the received key position signal includes the key position signal of the reserved key position, and the received key position signal is the combination of the key position signal of a target key position and reserved key position signal, the recognition result of the received key position signal is indicated as the one used to query the Basic Component signal of the target key position; the target key bit is used to indicate a key bit of a component Category Code.

Display module 1003 is also used to: display the Basic Components of the category corresponding to the component Category Code represented by the target key.

Key signal recognition module 1001 is also used to: if the received key position signal includes the key position signal of the reserved key position, and the first key position signal in the received key position signal is the reserved key position signal, indicates that the recognition result of the received key position signal is a pinyin input signal, wherein the key position signal corresponding to the key position input after the reserved key position is recognized as the pinyin.

Display module 1003 is also used to: display the Chinese characters or phrases corresponding to the pinyin.

Chinese character and phrase determination module 1002 is also used to: according to the key combination corresponding to the received key signal, in the Chinese character category input method table and the phrase input method table, respectively, look up the Chinese character category code and phrase category code that are consistent with the key combination, and determine the Chinese character and/or phrase represented by the searched Chinese character Category Code and/or phrase Category Code, wherein the Chinese character category input method table records the corresponding relationship between the Chinese character and the Chinese character Category Code, and the phrase input method table records the corresponding relationship between the phrase and the phrase Category Code.

Chinese character input system 1000 also includes a Chinese character category input method table generating module, which is used to generate the Chinese character Category Code of each Chinese character in advance to obtain the Chinese character category input method table, wherein the Chinese character Category Code of the Chinese character is generated in the following manner: Determine number of components of the Chinese character whose category code is to be generated, the number of components is the number of Chinese character Basic Components contained in the Chinese character category code to be generated; if the number of components is 1, then according to the Chinese character component Category Code and part or all of the stroke Category Code in the unique Chinese character Basic Component, the Chinese character Category Code is to be generated; if the number of components is 2, then according to the component Category Code of the two components and part or all of the stroke Category Code of the second component, the Chinese character Category Code is generated; if the number of components is greater than or equal to 3, then the Chinese character Category Code is to be generated according to all of the Basic Component Category Code of the Chinese character.

Chinese character input system 1000 also includes a stroke Category Code query module, which is used according to Basic Component Shape Code from Basic Components, query the corresponding part or all of the stroke Category Codes in the stroke Category Code table; among them, for Basic Component whose strokes do not exceed the preset number, said Basic Component stroke Category Code table records correspondence relationship between the Basic Component Shape Code and all stroke Category Codes of the Basic Component; for Basic Component whose number of strokes exceeding the preset number, said Basic Component stroke Category Code table records the corresponding relationship between the Basic Component Shape Code and the preset number of stroke Category Codes of the Basic Component.

In one embodiment, the Chinese character input system 1000 also includes stroke Category Code generation module, which is used according to the stroke type of Basic Component, the corresponding stroke Category Code for each stroke is configured, where: for the strokes in the component type strokes except for the folding pen strokes, the configured stroke Category Code is the component Category Code of the stroke; for the folding pen strokes in the component type strokes and non-component type strokes, the configured stroke Category Code is the designated key position; the component type strokes are themselves Basic Component strokes, non-component type strokes are not themselves Basic Component strokes.

From Basic Component shape code read from the Basic Component Shape Code table, the system also includes Basic Component Shape Code table building module, used to build Basic Component Shape Code table: for all the Basic Components according to the shape classification, get multiple Basic Component shape categories; take a different first alphabet as each Basic Component's shape Category Code, and for each Basic Component shape category, use different second alphabets as the Basic Component internal code of the component category to get each Basic Component Shape Code, and said Shape Code including a component Category Code and a component category internal code; according to each Basic Component Shape Code to generate each Basic Component ordered code table to construct the Basic Component Shape Code table.

In one embodiment, the component Category Code and the component category internal code are both letters.

All the Basic Components in Basic Component Shape Code table include those used to generate simplified characters, traditional characters, Chinese characters in Japanese, and Chinese characters in Korean Basic components.

Chinese character input system 1000 also includes a phrase input method table generating module, which is used to generate the phrase Category Code of each phrase to obtain the phrase input method table, wherein the phrase Category Code of the phrase is generated in the following way: the phrase of the phrase Category Code to be generated is determined, if the number of characters is 2, then generate the phrase Category Code of the phrase according to part or all of the component Category Code of each Chinese character in the phrase of the phrase Category Code to be generated; if the number of characters is greater than or equal to 3, then, according to the first component Category Code of each Chinese character in the phrase for which the phrase Category Code is to be generated, the phrase Category Code of the phrase is generated.

In one embodiment, the display module 1003 is also used to: display the determined Chinese characters and/or phrases in sequence according to the use frequency of the determined Chinese characters and/or phrases.

In one embodiment, the display module 1003 is also used for: in response to a user's input instruction, display a virtual keyboard of a variety of virtual keyboards, the virtual keyboard includes a plurality of virtual keys, the virtual keys and key positions are one-to-one correspondence, the virtual keys are used in order to show users some or all of Basic Components of the Basic Component shape category that matches to key positions, the multiple virtual keyboards can be switched based on the user's selection instruction, Basic Component shape category is one-to-one correspondence with the key positions.

In addition, the specific implementation content of the Chinese character input system in the embodiment of the present invention has been described in detail in the Chinese character input method described above, so the repeated content will not be described here.

The embodiment of the present invention is a systematic, high efficiency, low repetition rate, based on Basic Component Shape Codes and Chinese characters are coded to realize the easy-to-learn and fast Chinese character computer input method and keyboard matching, which solves the problem that the current Chinese character keyboard input method is either not easy to learn or not easy to type fast.

The embodiment of the present invention also provides a keyboard for Chinese character input based on the Chinese character input method of the embodiment of the present invention, including: keys matching the key positions corresponding to the component category codes and stroke category codes, and keys matching reserved key positions, the keyboard can generate the corresponding key position signal according to a user's key operation, and send it to the Chinese character input system of the embodiment of the present invention. After the Chinese character input system of the embodiment of the present invention receives the key position signal, it is input according to the Chinese character input method to input Chinese characters or phrases.

The embodiments of the present invention are based on the physical characteristics of the Basic Components, categorize them easily and understandably and establish an one-to-one relationship with the double-alphabets. Chinese characters composed of double-alphabet code contains all the physical information of Chinese characters. The computer input method of Chinese characters and the corresponding keyboard established on this basis are easy to learn and fast.

However, in the prior art, there are no standards to learn from, and therefore, it is rather messy and does not conform to the character theory. In addition, its various rules are very complicated, and it is very difficult to learn. There are also some technologies, and the conversion and classification of many components to letters are relatively random, the use of 1 to 3 letters to represent a component is confusing. Those rules are too complicated, the memory is large, and it is difficult to memorize and learn. There are also some technologies that are mainly used for Chinese character teaching, and are not really the Basic Components of Chinese characters suitable for typing. Therefore, those methods create confusion at the starting point. In addition, the layout of those component keyboard considers a variety of nongraphic factors. It is not easy to remember and learn. In addition, the logic of converting some technical components from pictograms to 1 to 3 letters is not strong, very reluctant, not very regular, and difficult to remember and learn.

The embodiment of the present invention can overcome the above-mentioned defects in the prior art. The embodiment of the present invention starts with the encoding of the lowest-level component itself, lays a solid foundation, and then establishes a complete holographic Chinese character encoding. Finally, on the basis of the code, a special type of code for typing components and stroke Category Codes and corresponding easy-to-learn, easy-to-use and fast input methods are established.

Figure 11:
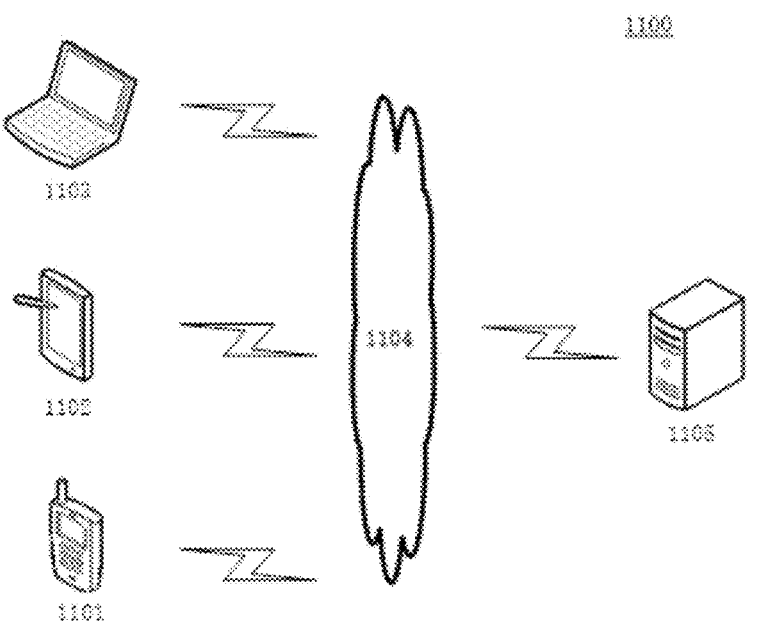
FIG. 11 is an exemplary system architecture diagram to which the embodiments of the present invention can be applied.

FIG. 11 shows an exemplary system architecture of the Chinese character input method or Chinese character input system to which the embodiments of the present invention can be applied.

As shown in FIG. 11, the system architecture 1100 can include terminal equipment 1101, 1102, 1103, network 1104 and server 1105. The internet 1104 used in terminal equipment 1101, 1102, 1103 and server 1105 provides the medium of communication link. The internet 1104 can include various connection types, such as wired, wireless communication links, or fiber optic cables, and so on.

Users can use terminal equipment 1101, 1102, 1103 through the network 1104 with the server 1105 interaction to receive or send messages, etc. Various communication client applications can be installed on terminal equipment 1101, 1102 and 1103, such as shopping applications, web browser applications, search applications, instant messaging tools, email clients, social platform software, etc. (only examples).

Terminal equipment 1101, 1102, 1103 can be various electronic devices that have a display screen and support web browsing, including but not limited to smart phones, tablet computers, laptop portable computers, desktop computers, and so on.

Server 1105 can be a server that provides various services, such as backstage management server (only examples) which supports user terminal equipment 1101, 1102, 1103 for shopping websites. The background management server can analyze and process the received product information query request and other data, and feeds back the processing results (such as target push information, product information-only examples) to the terminal devices.

It should be noted that the Chinese character input method provided by the embodiment of the present invention is generally used by a terminal device 1101, 1102, 1103 execution, correspondingly, the Chinese character input system is generally set in the terminal device 1101, 1102 and 1103.

Should understand, number of terminal devices, networks, and servers in FIG. 11 is only illustrative. According to implementation needs, there can be any number of terminal devices, networks, and servers.

Reference below FIG. 12, which shows a schematic diagram of a computer system 1200 suitable for implementing the terminal equipment of the embodiments of the present application. The terminal device shown in FIG. 12 is only an example, and should not bring any limitation to the function and scope of use of the embodiments of the present application.

Figure 12:
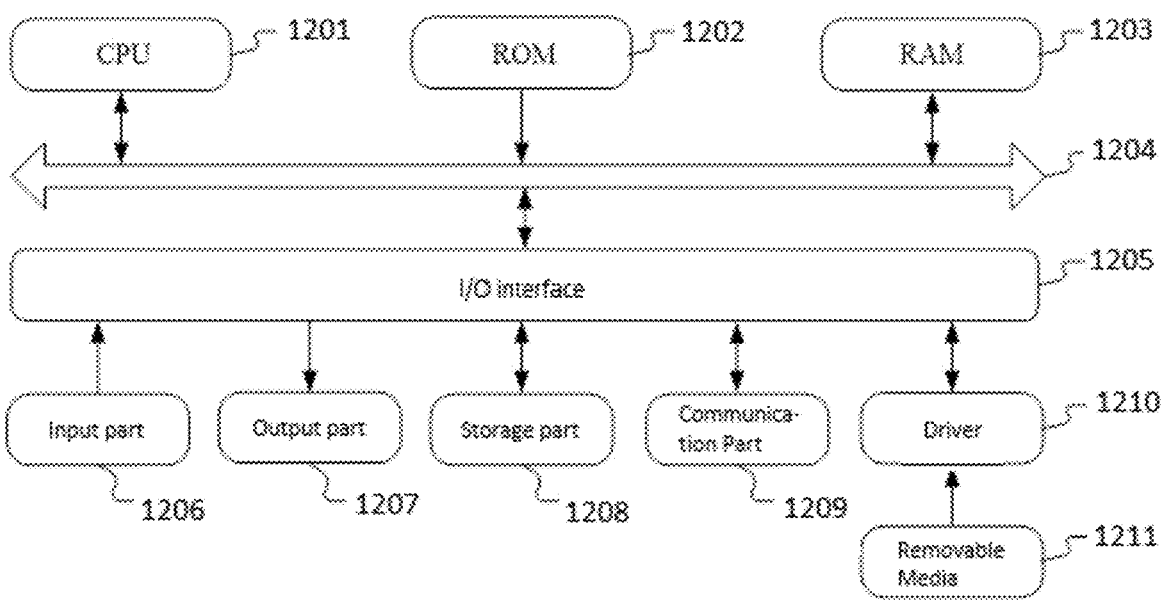
FIG. 12 is a schematic structural diagram of a computer system suitable for implementing the terminal device of the embodiment of the present invention.

As shown in FIG. 12, the computer system 1200 includes central processing unit (CPU) 1201, which can be stored in read-only memory (ROM) 1202 according to program or from the storage component 1208 loading to random access memory (RAM) 1203 in executing various appropriate actions and processing. In RAM 1203, there is also a system 1200 stored various programs and data required for operation. CPU 1201, ROM 1202 and RAM 1203 via the bus 1204 are connected to each other. Input/output (I/O) interface 1205 also connected to the bus 1204.

The following parts are connected to the I/O interface 1205: Input part 1206 including keyboard, mouse, etc.; output part 1207 including cathode ray tube (CRT), liquid crystal display (LCD), etc., and speakers; the storage part 1208 including hard disk; and the communication part 1209 including network interface cards such as LAN cards, modems, etc. Communication part 1209 performs communication processing via a network such as the Internet. Driver 1210 also connects to the I/O interface 1205 as needed. Removable media 1211, such as magnetic disks, optical disks, magneto-optical disks, semiconductor memory, etc., installed in the drive 1210 as needed, so that the computer program read from it is installed into the storage part 1208 as needed.

In particular, according to the disclosed embodiments of the present invention, the process described above with reference to the flowchart can be implemented as a computer software program. For example, the disclosed embodiments of the present invention include a computer program product, which includes a computer program carried on a computer-readable medium, and the computer program contains program code for executing the method shown in the flowchart. In such an embodiment, the computer program can be downloaded and installed from the Internet 1209, and/or installed from removable media 1211. When the central processing unit (CPU) 1201 executes the computer program, it executes the above-mentioned functions defined in the system of this application.

It should be noted that the computer-readable medium shown in the present invention may be a computer-readable signal medium or a computer-readable storage medium, or any combination of the two. The computer-readable storage medium may be, for example, but not limited to, an electrical, magnetic, optical, electromagnetic, infrared, or semiconductor system, device, or a combination of any of the above. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In this application, the computer-readable storage medium may be any tangible medium that contains or stores a program, and the program may be used by or in combination with an instruction execution system, apparatus, or device. In this application, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than a computer-readable storage medium. The computer-readable medium may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The flowcharts and block diagrams in the accompanying drawings illustrate the possible implementation of the system architecture, functions, and operations of the system, method, and computer program product according to various embodiments of the present application. In this regard, each block in the flowchart or block diagram can represent a module, program segment, or component of code, and the above-mentioned module, program segment, or component of code contains one or more for realizing the specified logic function, executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram or flowchart, and the combination of blocks in the block diagram or flowchart, can be implemented by a dedicated hardware-based system that performs the specified functions or operations, or can be realized by a combination of dedicated hardware and computer instructions.

The modules involved in the embodiments described in the present invention can be implemented in software or hardware. The described module can also be set in the processor, for example, it can be described as: a processor includes a key position signal recognition module, a Chinese character and phrase determination module, and a display module. Among them, the names of these modules do not constitute a limitation on the module itself under certain circumstances. For example, the key signal identification module can also be described as "a module for identifying the received key signal."

As another aspect, the present invention also provides a computer-readable medium. The computer-readable medium may be included in the device described in the above embodiment; or it may exist alone without being assembled into the device. The above-mentioned computer-readable medium carries one or more programs. When the above-mentioned one or more programs are executed by a device, the device includes: recognizing the received key signal; when the result indicates the Chinese character Category Code and/or phrase Category Code, determine the Chinese character and/or phrase represented by the recognized Chinese character Category Code and/or phrase Category Code; where the Chinese character Category Code is a combination of component Category Codes or the combination of the Category Code and the stroke Category Code, which is used to represent Chinese characters; the phrase Category Code is the combination of component Category Codes, used to represent phrases; and the determined Chinese characters and/or phrases are displayed.

According to the technical solution of the embodiment of the present invention, the received key signal is recognized; in the case that the recognition result of the received key signal indicates the Chinese character Category Code and/or the phrase Category Code, recognize the Chinese character and/or the phrase represented by the Chinese character Category Code and/or the phrase Category Code; where the Chinese character Category Code is a combination of component Category Codes or a combination of component Category Codes and stroke Category Codes, used to represent Chinese characters; phrase Category Codes are combinations of component Category Codes, used to indicate phrases; display the determined Chinese characters and/or phrases. Solve the problem of messy character splitting, conform to the character theory, easy to remember and easy to use, no special learning is required, the entire input process is very natural, there are not many rules or special requirements, and the learning difficulty is reduced.

The foregoing specific implementations do not constitute a limitation on the protection scope of the present invention. Those skilled in the art should understand that, depending on design requirements and other factors, various modifications, combinations, sub-combinations, and substitutions can occur. Any modification, equivalent replacement and improvement made within the spirit and principle of the present invention should be included in the protection scope of the present invention.

The invention claimed is:

1. A method for inputting Chinese characters, characterized in that it includes:

a key signal recognition method based on component categories to recognize a received key signal;

a Chinese character and phrase determination method based on the component categories being used when a recognition result of the received key signal indicates a Chinese character Category Code or phrase Category Code, to determine a Chinese character or phrase represented by the recognized Chinese character Category Code or phrase Category Code; wherein the component categories are groups of components being defined according to visual characteristics and similarities of components; wherein the Chinese character Category Code is a combination of component Category Codes or a combination of component Category Codes and stroke Category Codes, used to represent Chinese characters; wherein the phrase Category Code is a combination of component Category Codes used to represent phrases; wherein each of the component Category Codes consists of two alphabet letters representing the component categories; wherein each of the stroke Category Codes consists of two alphabet letters representing groups of Chinese strokes and are only used to further distinguish Chinese characters when the component Category Codes are not enough to do so;

a display method being used to display determined Chinese characters or phrases.

2. The method according to claim 1, wherein the key signal recognition method based on the component categories to recognize the received key signal comprises:

recognizing whether a received key position signal includes a key position signal of a reserved key position, wherein if a key position signal of a reserved key position is not included, the recognition result of the received key position signal is indicated as a Chinese character Category Code or a phrase Category Code.

3. The method according to claim 2, wherein the key signal recognition method based on the component categories to recognize the received key signal further comprises:

if the received key position signal includes the key position signal of the reserved key position, and the received key position signal is a combination of the key position signal of a target key position and the key position signal of the reserved key position, indicating the recognition result of the key combination as a signal for querying Basic Components to obtain a Basic Component corresponding to the target key, wherein the target key is a key used to represent a component Category Code;

displaying the Basic Component corresponding to the component category of the target key.

4. The method according to claim 2, wherein the key signal recognition method based on the component categories to recognize the received key signal further comprises:

if the received key position signal includes the key position signal of the reserved key position and the first key position signal in the received key position signal is the key position signal of the reserved key position, indicating the recognition result of the key combination corresponding to the received key signa as a pinyin input signal, wherein the key signal corresponding to key input after the reserved key is recognized as pinyin;

displaying Chinese characters or phrases corresponding to the pinyin.

5. The method according to claim 1, wherein determining the Chinese character or phrase represented by the recognized Chinese character Category Code or phrase Category Code comprises:

according to a key combination corresponding to the received key signal, searching the Chinese character Category Code and phrase Category Code consistent with the key combination in a Chinese character category input method table and a phrase input method table, and determining the Chinese character or phrase represented by the Chinese character Category Code or phrase Category Code, wherein the Chinese character category input method table records the corresponding relationship between the Chinese character and the Chinese character Category Code, and the phrase input method table records the corresponding relationship between the phrase and the phrase Category Code.

6. The method according to claim 5, further comprising pre-generating a Chinese character Category Code of each Chinese character to obtain the Chinese character category input method table, wherein the Chinese character Category Code of each Chinese character is generated in the following manner:

determining a number of components of each Chinese character to be generated for the Chinese character Category Code, and the number of components is a quantity of Basic Components contained in each Chinese character with a Chinese character Category Code to be generated;

for each Chinese character with the determined number of components being 1, generating the Chinese character Category Code of the Chinese character according to the component Category Code of the only component in the Chinese character and some or all of the stroke Category Code of the component;

for each Chinese character with the determined number of components being 2, generating the Chinese character Category Code of the Chinese character according to the component Category Codes of the two components in the Chinese character and the stroke Category Codes of some or all strokes of the second one of the two components with component order following stroke order of the Chinese character;

for each Chinese character with the determined the number of components being greater than or equal to 3, generating the Chinese character Category Code of the Chinese character according to the component Category Codes of all the components of the Chinese character.

7. The method according to claim 6, further comprising:

according to a Shape Code of a Basic Component, querying part or all of the stroke Category Codes in a corresponding stroke Category Code table of the Basic Components Component; wherein for each Basic Component whose stroke count does not exceed a preset number, configuring a stroke Category Code table to record relationships between the Shape Code and all stroke Category Codes of the Basic Component; and for each Basic Component whose stroke count exceeds the preset number, configuring the stroke Category Code table to record relationships between the Shape Code and the part of the stroke Category Codes which does not exceed the preset number.

8. The method according to claim 7, further comprising:

configuring stroke Category Codes of a Basic Component according to stoke types of the Basic Component, wherein:

for a stroke that is a component itself except for folding pen strokes, its configured stroke Category Code is the corresponding component Category Code of the stroke;

for a folding pen stroke or a stroke that is not a component itself, its configured stroke Category Code is a designated key position.

9. The method according to claim 7, wherein reading a Basic Component Shape Code from a component Shape Code table and constructing the component Shape Code table as follows:

for all Basic Components, getting multiple Basic Component shape categories according to their respective shape classifications;

using a respective first alphabet as the component Category Code of each Basic Component shape category, and for each Basic Component shape category, using a respective second alphabet as an internal code of each component in each Basic Component shape category to get the Shape Code of each Basic Component, wherein each Shape Code includes a component Category Code and a Basic Component shape category internal code;

according to the Shape Code of each Basic Component, generating an ordered code table of all the Basic Components to construct the Basic Component Shape Code table.

10. The method according to claim 9, wherein the component Category Code and the component category internal code are both alphabets.

11. The method of claim 9, wherein said all Basic Components include those used to generate Basic Components used in simplified characters, traditional characters, Chinese characters in Japanese, and Chinese characters in Korean.

12. The method according to claim 5, further comprising pre-generating a phrase Category Code of each phrase to obtain the phrase input method table, wherein the phrase Category Code of a phrase is generated in the following manner:

determining the number of the characters of the phrase to be generated for the phrase Category Code;

if the number of the characters is 2, generating the phrase Category Code of the phrase according to part or all of the component Category Code of each Chinese character in the phrase;

if the number of the characters is greater than or equal to 3, generating the phrase Category Code of the phrase according to the first component Category Code of each Chinese character in the phrase.

13. The method according to claim 5, wherein displaying determined Chinese characters or phrases comprises:

according to a use frequency of the determined Chinese characters-or phrases, sequentially displaying the determined Chinese characters or phrases.

14. The method of claim 1 further comprises:

in response to a user's input instruction, displaying one of virtual keyboards provided by the method, wherein a virtual keyboard includes a plurality of virtual keys, and the virtual keys correspond to key positions one-to-one, and the virtual keys are used to show a user some or all of Basic Components of a Basic Component shape category represented by a key, multiple virtual keyboards can be switched based on a user's selection instruction, the Basic Component shape category represented by the key is one-to-one correspondence with the position of the key.

15. A keyboard for Chinese character input based on the Chinese character input method of claim 1, it further comprising:

keys matching key positions corresponding to the component Category Code and the stroke Category Code, keys matching reserved key positions, and generating corresponding key position signals according to user's key operation to the keyboard.

16. An electronic device, comprising:

one or more processors;

memory, used to store one or more programs, when the one or more programs are executed by the one or more processors, the one or more processors being caused to implement the method according to claim 1.

17. A Chinese character input system, characterized in that it comprises:

a key signal recognition module, which is used to identify a received key position signal, specifically, to identify whether the received key position signal includes a key position signal of a reserved key position such that if the key position signal of the reserved key position is not included, the recognition result of the received key position signal is indicated as a Chinese character category code or phrase Category Code; if the received key position signal includes the key position signal of the reserved key position, and the received key position signal is the combination of the key position signal of a target key position and reserved key position signal, the recognition result of the received key position signal being indicated as the one used to query the Basic Component signal of the target key position; the target key bit being used to indicate a key bit of a component Category Code; and if the received key position signal includes the key position signal of the reserved key position, and first key position signal in the received key position signal is the reserved key position signal, indicating that the recognition result of the received key position signal is a pinyin input signal, wherein the key position signal corresponding to key position input after the reserved key position is recognized as pinyin;

a Chinese character and phrase determination module, which performs according to the key combination corresponding to the received key signal, in a Chinese character category input method table and a phrase input method table, respectively, looking up the Chinese character category code and phrase category code that are associated with the key combination, and determining a Chinese character or a phrase represented by a result of looking up Chinese character Category Code or phrase Category Code;

a display module, which is used to display the determined Chinese characters or phrases.

\* \* \* \* \*